US012771966B2

(12) United States Patent
Kito et al.

(10) Patent No.: US 12,771,966 B2
(45) Date of Patent: Oct. 20, 2026

(54) IMAGING DEVICE AND IMAGE SENSOR COMPRISING IMPEDANCE CONVERTER CONNECTED BETWEEN PIXELS AND AD CONVERTER IN EACH COLUMN

(71) Applicant: Nuvoton Technology Corporation Japan, Kyoto (JP)

(72) Inventors: Takayasu Kito, Hyogo (JP); Yutaka Abe, Osaka (JP); Makoto Ikuma, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 31 days.

(21) Appl. No.: 18/977,055

(22) Filed: Dec. 11, 2024

(65) Prior Publication Data

US 2025/0106536 A1 Mar. 27, 2025

Related U.S. Application Data

(63) Continuation of application No. PCT/JP2023/022361, filed on Jun. 16, 2023.

(30) Foreign Application Priority Data

Jun. 20, 2022 (JP) ................................ 2022-099059

(51) Int. Cl.
*H04N 25/772* (2023.01)
*H04N 25/671* (2023.01)
(Continued)

(52) U.S. Cl.
CPC ......... *H04N 25/772* (2023.01); *H04N 25/671* (2023.01); *H04N 25/677* (2023.01); *H04N 25/78* (2023.01); *H04N 25/79* (2023.01)

(58) Field of Classification Search
CPC .... H04N 25/67; H04N 25/671; H04N 25/677; H04N 25/77; H04N 25/771; H04N 25/772; H04N 25/76–79
See application file for complete search history.

(56) References Cited

U.S. PATENT DOCUMENTS

| | | | |
|---|---|---|---|
| 10,432,884 | B2 | 10/2019 | Niwa et al. |
| 10,750,111 | B2 | 8/2020 | Ebihara et al. |

(Continued)

FOREIGN PATENT DOCUMENTS

| | | |
|---|---|---|
| JP | 2010-098516 A | 4/2010 |
| JP | 2015-053648 A | 3/2015 |

(Continued)

OTHER PUBLICATIONS

Extended European Search Report issued for the corresponding European Patent Application No. 23827124.1, dated Jul. 11, 2025.

(Continued)

*Primary Examiner* — Twyler L Haskins
*Assistant Examiner* — Akshay Trehan
(74) *Attorney, Agent, or Firm* — Rimon P.C.

(57) ABSTRACT

An image sensor includes: a pixel array in which pixels are arranged in a matrix; impedance converter circuits for each column, each of which receives a pixel signal from at least one pixel; and an AD converter for each column that converts from analog to digital signals output from the impedance converter circuits. The pixel array includes, for each column, N pixel groups each including K or more pixels consecutively arranged in a column direction. Each of the N pixel groups includes a vertical signal line connected to L or more pixels among the K or more pixels. In each column, each of the N vertical signal lines of the N pixel groups is connected to the input of one of the impedance (Continued)

converter circuits, and the output of each of the impedance converter circuits is connected to the AD converter.

20 Claims, 24 Drawing Sheets

(51) Int. Cl.
*H04N 25/677* (2023.01)
*H04N 25/78* (2023.01)
*H04N 25/79* (2023.01)

(56) References Cited

U.S. PATENT DOCUMENTS 10,819,936 B2 10/2020 Ebihara et al.
10,827,143 B2 11/2020 Ebihara
2008/0088724 A1* 4/2008 Kudoh .................. H04N 25/70 348/340
2010/0097510 A1 4/2010 Wada et al.
2010/0276572 A1* 11/2010 Iwabuchi ............... H04N 23/54 257/443
2013/0068929 A1* 3/2013 Solhusvik ................. G06T 5/80 250/208.1
2015/0288908 A1* 10/2015 Shen ..................... G06F 30/392 348/308
2016/0156861 A1 6/2016 Kitani
2016/0182845 A1 6/2016 Hagihara
2016/0316166 A1 10/2016 Kubo et al.
2017/0103197 A1 4/2017 Degura
2017/0289480 A1* 10/2017 Ochiai .................. G05B 15/02
2018/0054578 A1 2/2018 Kitamori et al.
2018/0332248 A1 11/2018 Nishida
2019/0371841 A1 12/2019 Yamashita
2021/0136304 A1* 5/2021 Siaud ..................... H04N 25/41

FOREIGN PATENT DOCUMENTS

JP 2017-184185 A 10/2017
JP 6421342 B2 11/2018
JP 6463944 B2 2/2019
JP 6643035 B2 2/2020
JP 6778595 B2 11/2020
JP 6821590 B2 1/2021
JP 6910814 B2 7/2021

OTHER PUBLICATIONS

International Search Report (ISR) issued in International (PCT) Application No. PCT/JP2023/022361, dated Aug. 22, 2023.

* cited by examiner

IMAGING DEVICE AND IMAGE SENSOR COMPRISING IMPEDANCE CONVERTER CONNECTED BETWEEN PIXELS AND AD CONVERTER IN EACH COLUMN

CROSS REFERENCE TO RELATED APPLICATIONS

This is a continuation application of PCT International Application No. PCT/JP2023/022361 filed on Jun. 16, 2023, designating the United States of America, which is based on and claims priority of Japanese Patent Application No. 2022-099059 filed on Jun. 20, 2022. The entire disclosures of the above-identified applications, including the specifications, drawings and claims are incorporated herein by reference in their entirety.

FIELD

The present disclosure relates to an image sensor and an imaging device that capture an image

BACKGROUND

Image sensors for capturing an image have been known (e.g., see Patent Literature (PTL) 1).

CITATION LIST

Patent Literature

PTL 1: Japanese Unexamined Patent Application Publication No. 2015-53648

SUMMARY

Technical Problem

An increase in the readout rate at which a pixel signal is read out from a pixel is demanded for image sensors. Meanwhile, even if the readout rate becomes faster, the quality degradation of an image to be captured is not preferable.

In view of the above, the present disclosure aims to provide, for example, an image sensor capable of increasing the readout rate at which a pixel signal is read out from a pixel, while suppressing the quality degradation of an image to be captured.

Solution to Problem

An image sensor according to one aspect of the present disclosure includes: a pixel array in which a plurality of pixels are arranged in a matrix, the plurality of pixels each including: a photoelectric conversion unit that converts received light into a charge; a charge accumulation section that accumulates the charge converted by the photoelectric conversion unit; and an amplifying transistor that outputs a pixel signal corresponding to the amount of the charge accumulated in the charge accumulation section; a plurality of first impedance converter circuits for each column of the pixel array, each of which is a first impedance converter circuit in which output impedance is lower than input impedance and that receives a pixel signal from at least one of the plurality of pixels; and a first analog-to-digital (AD) converter for each column of the pixel array, the first AD converter converting from analog to digital a plurality of first impedance conversion signals output from the plurality of first impedance converter circuits. The pixel array includes, for each column, N pixel groups each including K or more pixels included in the plurality of pixels and consecutively arranged in a column direction of the pixel array, N and K each being an integer of two or more, each of the N pixel groups includes a first vertical signal line connected to L or more first pixels among the K or more pixels, L being an integer of at least two and at most K, and in each column of the pixel array, each of the N first vertical signal lines of the N pixel groups is connected to the input of one of the plurality of first impedance converter circuits, and the output of each of the plurality of first impedance converter circuits is connected to the first AD converter.

An imaging device according to another aspect of the present disclosure includes the image sensor described above.

An image sensor according to still another aspect of the present disclosure includes: a pixel array in which a plurality of pixels are arranged in a matrix, the plurality of pixels each including a photoelectric conversion unit that converts received light into a charge; pixel groups each including pixels included in the plurality of pixels in the pixel array; a vertical signal line connected to at least one of the pixels included in one of the pixel groups; an impedance converter circuit that is connected to the vertical signal line and in which output impedance is lower than input impedance; and an analog-to-digital (AD) converter connected to the impedance converter circuit.

Advantageous Effects

By using, for example, the image sensor according to one aspect of the present disclosure, it is possible to increase the readout rate at which to read out a pixel signal from a pixel, while suppressing the quality degradation of an image to be captured.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
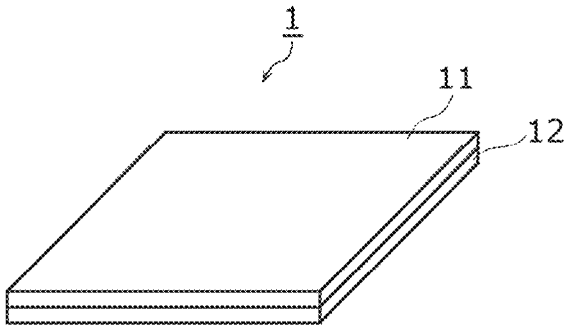
FIG. 1 is a perspective view illustrating the exterior of an image sensor according to Embodiment 1.

DESCRIPTION OF EMBODIMENTS (Circumstances Leading to One Aspect of Present Disclosure)

As a technique of increasing a readout rate at which to read out a pixel signal from a pixel, conventionally, there is a known technique of dividing a vertical signal line disposed for each column of a pixel array into vertical signal lines, connecting analog-to-digital (AD) converters to the vertical signal lines after the division (hereinafter, also referred to as divided vertical signal lines), and reading out pixel signals from pixels in each column by using the divided vertical signal lines and the AD converters.

When compared with the technique of reading out pixel signals from pixels in each column by using one vertical signal line and one AD converter, the above-mentioned technique enables the following: the wiring capacity of each of the divided vertical signal lines is less than the wiring capacity of the one vertical signal line, and the number of pixels connected as loads to each of the divided vertical signal lines is less than the number of pixels connected as loads to the one vertical signal line. Thus, it is possible to increase the readout rate at which to read out a pixel signal from a pixel.

On the other hand, the inventors of the present application had conducted experiments using the technique and made analysis. As a result, they discovered that using the technique may generate a degradation phenomenon of an image captured by an image sensor.

That is, in the technique, pixel signals from pixels connected to different divided vertical signal lines are read out by different AD converters. Thus, the characteristics of an AD converter connected to one of the divided vertical signal lines are reflected in pixel signals read out for each of the divided vertical signal lines. Thus, when characteristic differences are generated between AD converters due to, for example, manufacturing variations, the characteristic differences between the AD converters are reflected in the pixel signals read out from the pixels connected to the different divided vertical signal lines. As a result, the quality of the image captured by the image sensor degrades.

In view of the above, the inventors made further analysis and repeated experiments on the basis of the above discovery in order to suppress the quality degradation of an image captured by the image sensor. Finally, they arrived at, for example, the image sensor according to the present disclosure described below.

An image sensor according to one aspect of the present disclosure includes: a pixel array in which a plurality of pixels are arranged in a matrix, the plurality of pixels each including: a photoelectric conversion unit that converts received light into a charge; a charge accumulation section that accumulates the charge converted by the photoelectric conversion unit; and an amplifying transistor that outputs a pixel signal corresponding to the amount of the charge accumulated in the charge accumulation section; a plurality of first impedance converter circuits for each column of the pixel array, each of which is a first impedance converter circuit in which output impedance is lower than input impedance and that receives a pixel signal from at least one of the plurality of pixels; and a first analog-to-digital (AD) converter for each column of the pixel array, the first AD converter converting from analog to digital a plurality of first impedance conversion signals output from the plurality of first impedance converter circuits. The pixel array includes, for each column, N pixel groups each including K or more pixels included in the plurality of pixels and consecutively arranged in a column direction of the pixel array, N and K each being an integer of two or more, each of the N pixel groups includes a first vertical signal line connected to L or more first pixels among the K or more pixels, L being an integer of at least two and at most K, and in each column of the pixel array, each of the N first vertical signal lines of the N pixel groups is connected to the input of one of the plurality of first impedance converter circuits, and the output of each of the plurality of first impedance converter circuits is connected to the first AD converter.

In the image sensor configured as described above, in each column, each of the plurality of first pixels are connected to one of the N first vertical signal lines after division of a first vertical signal line by N. Thus, in comparison with the configuration where in each column, a plurality of first pixels are connected to one vertical signal line, in the image sensor configured as described above, the wiring capacity of each first vertical signal line is less than the wiring capacity of the one vertical signal line, and the number of first pixels connected as loads to each first vertical signal line is less than the number of first pixels connected as loads to the one vertical signal line. Thus, it is possible to increase the readout rate at which to read out a pixel signal from a first pixel.

Moreover, in the image sensor configured as described above, in each column, each of the N first vertical signal lines is connected to the same AD converter via one of the plurality of first impedance converter circuits. As such, in the image sensor configured as described above, in comparison with the configuration where in each column, the N first vertical signal lines are connected one-to-one to the AD converters, characteristic differences that can be generated between the AD converters are less likely to be reflected in pixel signals read out from first pixels connected to different first vertical signal lines. Thus, in the image sensor configured as described above, the quality degradation of an image captured by the image sensor due to the occurrence of the characteristic differences between the AD converters in each column is suppressed.

Accordingly, in the image sensor configured as described above, it is possible to increase the readout rate at which to read out a pixel signal from a pixel, while suppressing the quality degradation of an image to be captured.

Furthermore, L may be equal to K, and the K or more pixels may be the L or more first pixels.

As such, in each of the N pixel groups, all pixels included in the pixel group can be treated as first pixels.

Furthermore, K may be an integer of four or more, L may be an integer of at least two and at most K/2, the image sensor may further include: a plurality of second impedance converter circuits for each column of the pixel array, each of which is a second impedance converter circuit in which output impedance is lower than input impedance and that receives a pixel signal from at least one of the plurality of pixels; and a second analog-to-digital (AD) converter for each column of the pixel array, the second AD converter converting from analog to digital a plurality of second impedance conversion signals output from the plurality of second impedance converter circuits, each of the N pixel groups may further include a second vertical signal line connected to L or more second pixels included in the K or more pixels and different from the L or more first pixels, and in each column of the pixel array, each of the N second vertical signal lines of the N pixel groups may be connected to the input of one of the plurality of second impedance converter circuits, and the output of each of the plurality of second impedance converter circuits may be connected to the second AD converter.

As such, in each column, pixel signals can be read out in parallel from a first pixel and a second pixel which are included in the same pixel group, that is, are relatively close to each other. Thus, when pixel signals are read out from pixels on which readout scanning is sequentially performed for each row, it is possible to decrease, to a relatively small shift (rolling shutter distortion), the shift of a subject in a captured image that can be caused by reading out pixel signals in parallel from two pixels relatively distant from each other in each column when capturing an image of the moving subject. Thus, it is possible to make the aliasing less noticeable.

Furthermore, in each column of the pixel array, the output of each of at least one first impedance converter circuit among the plurality of first impedance converter circuits may be connected to the first AD converter via a first common signal line, and the output of each of at least an other first impedance converter circuit among the plurality of first impedance converter circuits may be connected to the first AD converter via a second common signal line different from the first common signal line.

As such, in comparison with the configuration where in each column, all the outputs of the plurality of first impedance converter circuits are connected to the first AD converters via one common signal line, it is possible to decrease a load capacity to be driven by at least one first impedance converter circuit among the plurality of first impedance converter circuits and a load capacity to be driven by at least another first impedance converter circuit among the plurality of first impedance converter circuits. Thus, it is possible to further increase the readout rate at which to read out a pixel signal from a pixel.

Furthermore, in each column of the pixel array, the input of each of at least one first impedance converter circuit among the plurality of first impedance converter circuits may be connected to one of the two first vertical signal lines of two pixel groups adjacent to each other in the column direction of the pixel array among the N pixel groups.

As such, in each column, one first impedance converter circuit can be shared by the two first vertical signal lines of the two pixel groups adjacent to each other in a column direction.

Furthermore, each of the plurality of first impedance converter circuits may include an output transistor that outputs a first impedance conversion signal corresponding to the first impedance converter circuit among the plurality of first impedance conversion signals, and the output transistor may have a drive capability higher than the drive capability of the amplifying transistor.

As such, in each column, it is possible to further increase the readout rate at which to read out pixel signals from the first pixels via the first impedance converter circuits.

Furthermore, the image sensor may further include: a plurality of current sources for each column of the pixel array that pass currents through the N first vertical signal lines; and a reference current source that uniformly specifies currents flowing through at least two current sources among all current sources included in the image sensor.

As such, it is possible to uniformly specify currents flowing through all the current sources included in the pixel array.

Furthermore, N may be an integer of four or more, the image sensor may be configured by including a first semiconductor chip and a second semiconductor chip stacked on one another, the first semiconductor chip being a semiconductor chip in which the pixel array is formed, the second semiconductor chip being a semiconductor chip in which the plurality of first impedance converter circuits and the first AD converter included for each column of the pixel array are formed, in a plan view of the pixel array, in each column of the pixel array, the N first vertical signal lines of the N pixel groups may extend and be aligned in the column direction of the pixel array, a first impedance converter circuit among the plurality of first impedance converter circuits may be positioned between a third vertical signal line and a fourth vertical signal line in the column direction of the pixel array, the third vertical signal line and the fourth vertical signal line being included in the N first vertical signal lines and being adjacent to each other, and an other first impedance converter circuit among the plurality of first impedance converter circuits may be positioned between a fifth vertical signal line and a sixth vertical signal line in the column direction of the pixel array, the fifth vertical signal line and the sixth vertical signal line being included in the N first vertical signal lines and being adjacent to each other and different from the third vertical signal line and the fourth vertical signal line.

As such, in each column, the distance from each of the third vertical signal line and the fourth vertical signal line to one first impedance converter circuit among the plurality of first impedance converter circuits can be made relatively short, and the distance from each of the fifth vertical signal line and the sixth vertical signal line to another first impedance converter circuit among the plurality of first impedance converter circuits can be made relatively short.

Furthermore, the image sensor may be configured by including a first semiconductor chip and a second semiconductor chip stacked on one another, the first semiconductor chip being a semiconductor chip in which the pixel array is formed, the second semiconductor chip being a semiconductor chip in which the plurality of first impedance converter circuits and the first AD converter included for each column of the pixel array are formed, in the plan view of the pixel array, in each column of the pixel array, the N first vertical signal lines of the N pixel groups may extend and be aligned in the column direction of the pixel array, and a presence area in the column direction of the pixel array of one or more lines for connecting the output of each of the plurality of first impedance converter circuits and the first AD converter may be within a presence area in the column direction of the pixel array of the N first vertical signal lines.

As such, in each column, the one or more lines for connecting the output of each of the plurality of first impedance converter circuits and the first AD converter are suppressed from becoming unnecessarily long.

Furthermore, the image sensor may be configured by including a first semiconductor chip and a second semiconductor chip stacked on one another, the first semiconductor chip being a semiconductor chip in which the pixel array is formed, the second semiconductor chip being a semiconductor chip in which the plurality of first impedance converter circuits and the first AD converter included for each column of the pixel array are formed, in the plan view of the pixel array, in each column of the pixel array, the N first vertical signal lines of the N pixel groups may extend and be aligned in the column direction of the pixel array, and the total sum of each length of one or more lines for connecting the output of each of the plurality of first impedance converter circuits and the first AD converter may be less than the total sum of lengths of the N first vertical signal lines.

As such, in each column, the one or more lines for connecting the output of each of the plurality of first impedance converter circuits and the first AD converter are suppressed from becoming unnecessarily long.

Furthermore, the pixel array may further include, for each column, a plurality of current sources that pass currents through the N first vertical signal lines, the image sensor may further include a controller that controls all current sources included in the pixel array, and in each column of the pixel array, the controller may cause a current source, among the plurality of current sources, that passes a current through the first vertical signal line of a readout execution pixel group to enter an active state, and one or more other current sources among the plurality of current sources to enter a non-active state, the readout execution pixel group being a pixel group including the K or more pixels that output pixel signals.

As such, in each column, the one or more current sources except for the current source that passes the current through the first vertical signal line of the readout execution pixel group can be brought to the non-active state. Thus, in comparison with the case where currents are passed through all the first vertical signal lines, it is possible to suppress the power consumption of the image sensor.

Furthermore, the pixel array may further include, for each column, a plurality of current sources that pass currents through the N first vertical signal lines, the image sensor may further include a controller that controls all current sources included in the pixel array, and in each column of the pixel array, the controller may cause a current source, among the plurality of current sources, that passes a current through the first vertical signal line of a readout execution pixel group to enter a first active state, and one or more other current sources among the plurality of current sources to enter a second active state in which a current amount is less than a current amount in the first active state, the readout execution pixel group being a pixel group including the K or more pixels that output pixel signals.

As such, in each column, the one or more current sources except for the current source that passes the current through the first vertical signal line of the readout execution pixel group can be brought to the second active state in which the current amount is less than the current amount in the first active state. Thus, in comparison with the case where a current of a current amount corresponding to the first active state is passed through all the first vertical signal lines, it is possible to suppress the power consumption of the image sensor.

Furthermore, the pixel array may further include, for each column, a plurality of current sources that pass currents through the N first vertical signal lines, the image sensor may further include a controller that controls all current sources included in the pixel array, and in each column of the pixel array, the controller (1) may cause a current source, among the plurality of current sources, that passes a current through the first vertical signal line of a readout execution pixel group to enter an active state, the readout execution pixel group being a pixel group including the K or more pixels that output pixel signals, (2) may cause a current source, among the plurality of current sources, that passes a current through the first vertical signal line of a readout pre-execution pixel group to enter the active state before the K or more pixels included in the readout pre-execution pixel group start outputting pixel signals, the readout pre-execution pixel group being a pixel group including the K or more pixels that will output the pixel signals following output of the K or more pixels of the readout execution pixel group, and (3) may cause one or more current sources except for the current source that passes the current through the first vertical signal line of the readout execution pixel group and the current source that passes the current through the first vertical signal line of the readout pre-execution pixel group, to enter a non-active state.

In general, if, immediately after a current source is changed from the non-active state to the active state, a pixel signal is read out from a pixel by using a first vertical signal line through which a current is passed by the above-mentioned current source, it may not be able to read out the pixel signal with high accuracy.

By contrast, in the image sensor configured as described above, in each column, the current source that passes the current through the first vertical signal line of the readout execution pixel group is changed from the non-active state to the active state before the pixels included in the readout execution pixel group start outputting the pixel signals. Thus, in the image sensor configured as described above, when pixel signals are read out from pixels, it is possible to suppress the situation of not being able to read out the pixel signals with high accuracy.

Furthermore, the pixel array may further include, for each column, a plurality of current sources, and one or more current sources among the plurality of current sources pass a current through a power supply line connected to the K or more pixels included in each of the N pixel groups, the image sensor may further include a controller that controls all current sources included in the pixel array, and in each column of the pixel array, the controller may cause a current source, among the plurality of current sources, that passes a current through the power supply line connected to the K or more pixels included in a readout pre-execution pixel group to enter an active state before the K or more pixels included in the readout pre-execution pixel group start outputting pixel signals, the readout pre-execution pixel group being a pixel group including the K or more pixels that will output the pixel signals following output of the K or more pixels included in a readout execution pixel group, the readout execution pixel group being a pixel group including the K or more pixels that output pixel signals, and may cause one or more current sources except for the current source that passes the current through the power supply line connected to the K or more pixels included in the readout pre-execution pixel group to enter a non-active state.

In general, a voltage difference equivalent to a voltage drop amount due to an IR drop caused according to the amount of flowing current occurs between a power supply voltage supplied to a pixel in a state in which a current is not flowing through a power supply line connected to the pixel and a power supply voltage supplied to the pixel in a state in which a current is flowing through the power supply line connected to the pixel. Furthermore, there will be a difference in pixel signals to be read out, between when a pixel signal is read out from a pixel in a state in which an IR drop is not being caused and when a pixel signal is read out from the pixel in a state in which an IR drop is being caused.

By contrast, in the image sensor configured as described above, in each column, a current starts flowing through the power supply line connected to the pixels included in the readout pre-execution pixel group before the pixels included in the readout pre-execution pixel group start outputting pixel signals. Thus, in the image sensor configured as described above, in each column, an IR drop is expected to occur by the time the pixels included in the readout pre-execution pixel group start outputting the pixel signals. Thus, in the image sensor configured as described above, when pixel signals are read out from pixels, it is possible to suppress the situation of not being able to read out the pixel signals with high accuracy depending on whether there is an IR drop.

Furthermore, the pixel array may further include, for each column, a plurality of current sources that pass currents through the N first vertical signal lines, the image sensor may further include a controller that controls all current sources included in the pixel array, and in each column of the pixel array, the controller (1) may cause a current source, among the plurality of current sources, that passes a current through the first vertical signal line of a readout execution pixel group to enter an active state, the readout execution pixel group being a pixel group including the K or more pixels that output pixel signals, (2) may cause a current source, among the plurality of current sources, that passes a current through the first vertical signal line of a readout post-execution pixel group to remain in the active state for a certain period of time even after the K or more pixels included in the readout post-execution pixel group finish outputting pixel signals, the readout post-execution pixel group being a pixel group including the K or more pixels that have output the pixel signals preceding output of the K or more pixels of the readout execution pixel group, and (3) may cause one or more current sources except for the current source that passes the current through the first vertical signal line of the readout execution pixel group and the current source that passes the current through the first vertical signal line of the readout post-execution pixel group, to enter a non-active state.

In general, when a current source that passes a current through a vertical signal line in a column is changed from the active state to the non-active state, a negative effect may be exerted on a current flowing through a vertical signal line in another column adjacent to the column. Then, it may not be able to read out pixel signals with high accuracy from pixels connected to the first vertical signal line in the adjacent column.

By contrast, in the image sensor configured as described above, even if in the certain period of time after the completion of readout of the pixel signals from the pixels included in the readout execution pixel group in a column, pixels in which readout of pixel signals continues are present in another column adjacent to the column, the current source that passes the current through the first vertical signal line of the readout execution pixel group remains in the active state for the certain period of time. Thus, even if in the certain period of time after the completion of readout of the pixel signals from the pixels included in the readout execution pixel group in a column, pixels in which readout of pixel signals continues are present in another column adjacent to the column, it is possible to suppress the situation of not being able to read out pixel signals from these pixels with high accuracy.

Furthermore, the pixel array may further include, for each column, a plurality of current sources, and one or more current sources among the plurality of current sources pass a current through a power supply line connected to the K or more pixels included in each of the N pixel groups, the image sensor may further include a controller that controls all current sources included in the pixel array, and in each column of the pixel array, the controller may cause a current source, among the plurality of current sources, that passes a current through the power supply line connected to the K or more pixels included in a readout post-execution pixel group to remain in an active state for a certain period of time even after the K or more pixels included in the readout post-execution pixel group finish outputting pixel signals, the readout post-execution pixel group being a pixel group including the K or more pixels that have output the pixel signals preceding output of the K or more pixels included in a readout execution pixel group, the readout execution pixel group being a pixel group including the K or more pixels that output pixel signals, and may cause one or more current sources except for the current source that passes the current through the power supply line connected to the K or more pixels included in the readout post-execution pixel group to enter a non-active state.

In general, a voltage difference equivalent to a voltage drop amount due to an IR drop caused according to the amount of flowing current occurs between a power supply voltage supplied to a pixel in a state in which a current is not flowing through a power supply line connected to the pixel and a power supply voltage supplied to the pixel in a state in which a current is flowing through the power supply line connected to the pixel. Furthermore, there will be a difference in pixel signals to be read out, between when a pixel signal is read out from a pixel in a state in which an IR drop is not being caused and when a pixel signal is read out from the pixel in a state in which an IR drop is being caused.

Moreover, when in a column, the state changes from the state in which a current is flowing through pixels to the state in which the current is not flowing through the pixels, the voltages of the power supply lines connected to pixels in another column adjacent to the column may change. In some cases, pixel signals cannot be read out from the pixels included in the adjacent column with high accuracy.

By contrast, in the image sensor configured as described above, even if in the certain period of time after the completion of readout of the pixel signals from the pixels included in the readout execution pixel group in a column, pixels in which readout of pixel signals continues are present in another column adjacent to the column, the power supply line connected to the pixels included in the readout execution pixel group in the column remains in the state in which a current is flowing for the certain period of time. Thus, in the image sensor configured as described above, even if in the certain period of time after the completion of readout of the pixel signals from the pixels included in the readout execution pixel group in a column, pixels in which readout of pixel signals continues are present in another column adjacent to the column, it is possible to suppress the situation of not being able to read out pixel signals from these pixels with high accuracy.

Furthermore, N may be an even number of four or more, in each column of the pixel array, the N pixel groups may include at least a first pixel group, a second pixel group, a third pixel group, and a fourth pixel group, and for each column of the pixel array, the image sensor may include: a first switch that switches between a conductive state in which the first vertical signal line included in the first pixel group and the first vertical signal line included in the second pixel group are electrically connected and a nonconductive state in which the first vertical signal line included in the first pixel group and the first vertical signal line included in the second pixel group are not electrically connected; and a second switch that switches between a conductive state in which the first vertical signal line included in the third pixel group and the first vertical signal line included in the fourth pixel group are electrically connected and a nonconductive state in which the first vertical signal line included in the third pixel group and the first vertical signal line included in the fourth pixel group are not electrically connected.

As such, in each column, it is possible to read out pixel signals in a mixed state from the first pixels included in the first pixel group and the first pixels included in the second pixel group, and it is possible to read out pixel signals in a mixed state from the first pixels included in the third pixel group and the first pixels included in the fourth pixel group.

Furthermore, K may be an integer of eight or more, L may be an integer of at least two and at most K/4, each of the N pixel groups may further include a third vertical signal line and a fourth vertical signal line, the third vertical signal line being connected to L or more third pixels included in the K or more pixels and different from the L or more first pixels and the L or more second pixels, the fourth vertical signal line being connected to L or more fourth pixels included in the K or more pixels and different from the L or more first pixels, the L or more second pixels, and the L or more third pixels, for each column of the pixel array, the image sensor may further include: a plurality of third impedance converter circuits, each of which is a third impedance converter circuit in which output impedance is lower than input impedance and that receives a pixel signal from at least one of the plurality of pixels; a plurality of fourth impedance converter circuits, each of which is a fourth impedance converter circuit in which output impedance is lower than input impedance and that receives a pixel signal from at least one of the plurality of pixels; a third analog-to-digital (AD) converter that converts from analog to digital a plurality of third impedance conversion signals output from the plurality of third impedance converter circuits; and a fourth analog-to-digital (AD) converter that converts from analog to digital a plurality of fourth impedance conversion signals output from the plurality of fourth impedance converter circuits, for each of the N pixel groups of each column of the pixel array, the image sensor may include: a first switch that switches between a conductive state in which the first vertical signal line and the third vertical signal line are electrically connected and a nonconductive state in which the first vertical signal line and the third vertical signal line are not electrically connected; and a second switch that switches a conductive state in which the second vertical signal line and the fourth vertical signal line are electrically connected and a nonconductive state in which the second vertical signal line and the fourth vertical signal line are not electrically connected, and for each column of the pixel array, each of the N third vertical signal lines of the N pixel groups may be connected to the input of one of the plurality of third impedance converter circuits, the output of each of the plurality of third impedance converter circuits may be connected to the third AD converter, each of the N fourth vertical signal lines of the N pixel groups may be connected to the input of one of the plurality of fourth impedance converter circuits, and the output of each of the plurality of fourth impedance converter circuits may be connected to the fourth AD converter, and each of the photoelectric conversion units of the L or more first pixels and the photoelectric conversion units of the L or more third pixels may receive light of a first color that has transmitted through a first color filter, and each of the photoelectric conversion units of the L or more second pixels and the photoelectric conversion units of the L or more fourth pixels may receive light of a second color that has transmitted through a second color filter, the second color being different from the first color.

As such, in each pixel group of each column, it is possible to read out pixel signals in a mixed state from the first pixels and the third pixels which receive light of the first color, and it is possible to read out pixel signals in a mixed state from the second pixels and the fourth pixels that receive light of the second color.

An imaging device according to another aspect of the present disclosure includes the image sensor described above.

In the image sensor included in the imaging device configured as described above, it is possible to increase the readout rate at which to read out a pixel signal from a pixel, while suppressing the quality degradation of an image to be captured, as described above.

Thus, in the imaging device configured as described above, it is possible to increase the readout rate at which to read out a pixel signal from a pixel, while suppressing the quality degradation of an image to be captured.

An image sensor according to still another aspect of the present disclosure includes: a pixel array in which a plurality of pixels are arranged in a matrix, the plurality of pixels each including a photoelectric conversion unit that converts received light into a charge; pixel groups each including pixels included in the plurality of pixels in the pixel array; a vertical signal line connected to at least one of the pixels included in one of the pixel groups; an impedance converter circuit that is connected to the vertical signal line and in which output impedance is lower than input impedance; and an analog-to-digital (AD) converter connected to the impedance converter circuit.

In the image sensor configured as described above, it is possible to increase the readout rate at which to read out a pixel signal from a pixel, while suppressing the quality degradation of an image to be captured.

Hereinafter, specific examples of, for instance, the image sensors according to the aspects of the present disclosure are described with reference to the drawings. Each of the embodiments described below is one specific example of the present disclosure. Accordingly, the numerical values, shapes, constituent elements, arrangement and connection of the constituent elements, as well as steps (processes), orders of the steps, and other details indicated in the following embodiments are merely examples, and do not intend to limit the present disclosure. Moreover, the figures are schematic illustrations and are not necessarily precise depictions. In the figures, substantially the same elements are assigned the same reference symbol, and repeated explanations may be omitted or simplified.

Embodiment 1

Hereinafter, an image sensor for capturing an image is described.

[Configuration]

FIG. 1 is a perspective view illustrating the exterior of image sensor 1 according to Embodiment 1.

As illustrated in FIG. 1, image sensor 1 is configured by including first semiconductor chip 11 and second semiconductor chip 12 stacked on one another.

Figure 2:
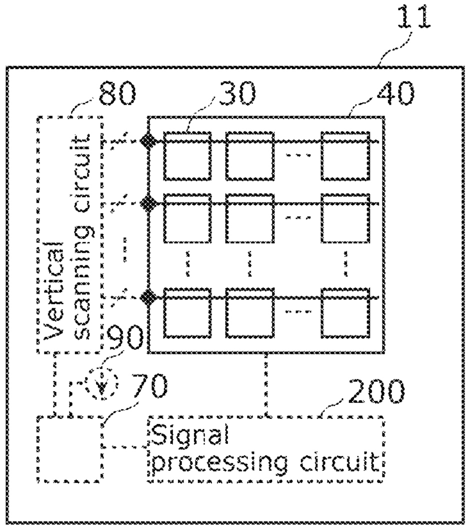
FIG. 2 is a plan view of a first semiconductor chip according to Embodiment 1.

FIG. 2 is a plan view of first semiconductor chip 11.

In FIG. 2, constituent elements formed in first semiconductor chip 11 are illustrated by the continuous lines, whereas some of constituent elements formed in second semiconductor chip 12 are illustrated by the dashed lines. That is, only the constituent elements illustrated by the continuous lines in FIG. 2 are formed in first semiconductor chip 11.

Here, the illustrated positions of the constituent elements that are formed in second semiconductor chip 12 and illustrated by the dashed lines in FIG. 2 are the positions of the constituent elements projected onto first semiconductor chip 11 in a direction perpendicular to the back surface of image sensor 1 in the state in which first semiconductor chip 11 and second semiconductor chip 12 are stacked on one another.

As illustrated in FIG. 2, pixel array 40 where pixels 30 are arranged in a matrix is formed in first semiconductor chip 11.

Figure 3:
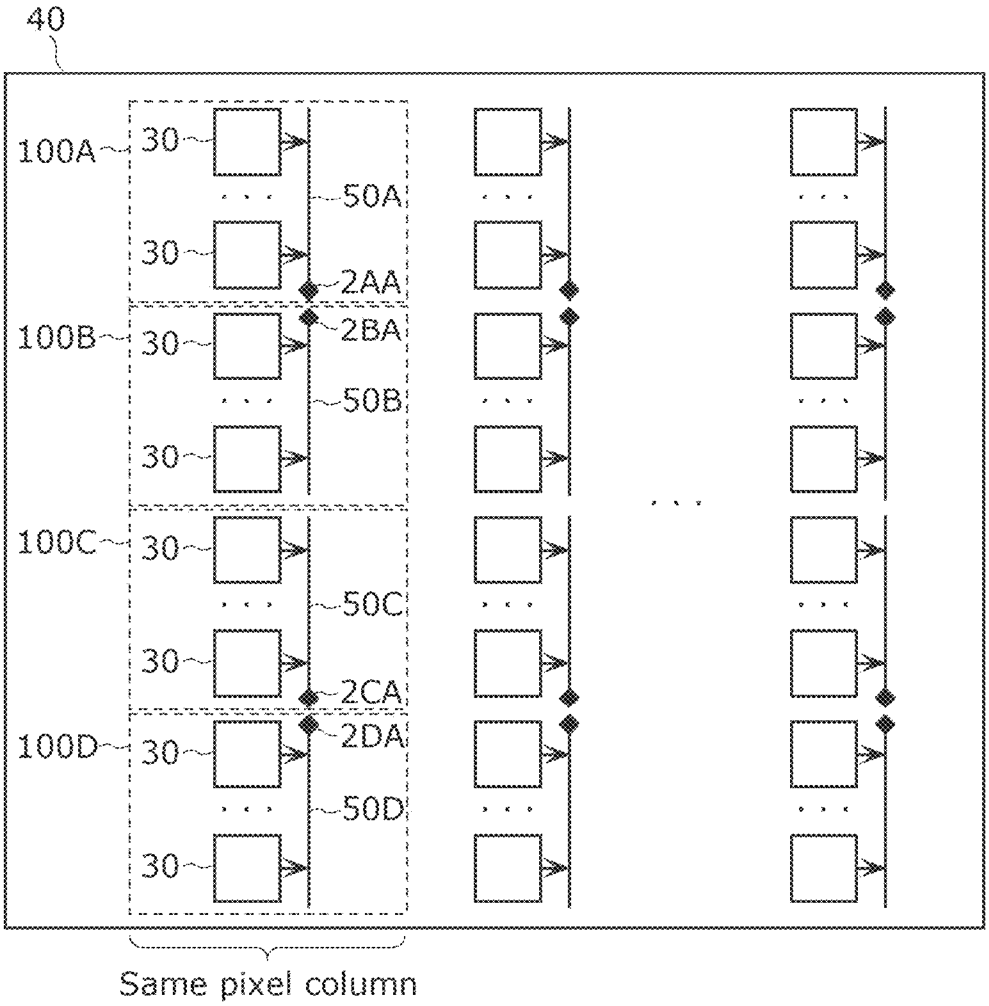
FIG. 3 is a plan view of a pixel array according to Embodiment 1.

FIG. 3 is a plan view of pixel array 40.

As illustrated in FIG. 3, pixel array 40 includes, for each column, N pixel groups 100 (corresponding to first pixel group 100A, second pixel group 100B, third pixel group 100C, and fourth pixel group 100D in FIG. 3), where N is an integer of three or more. Here, each of N pixel groups 100 includes K or more pixels 30 consecutively arranged in a column direction, where K is an integer of two or more. Here, as an example, as illustrated in FIG. 3, the case where N is four, that is, N pixel groups 100 are the four pixel groups: first pixel group 100A, second pixel group 100B, third pixel group 100C, and fourth pixel group 100D is described. However, as long as N is an integer of three or more, N need not necessarily be limited to four. Furthermore, in the explanation here, each of pixel groups 100 includes K pixels 30. However, not all of pixel groups 100 need necessarily be limited to the configuration of including K pixels 30. For instance, first pixel group 100A may include K pixels 30, second pixel group 100B may include K+1 pixels 30, third pixel group 100C may include K pixels 30, and fourth pixel group 100D may include K+2 pixels 30.

As illustrated in FIG. 3, each of N pixel groups 100 includes first vertical signal line 50 connected to K pixels 30 (first vertical signal line 50 corresponds to first vertical signal line 50A, first vertical signal line 50B, first vertical signal line 50C, first vertical signal line 50D in FIG. 3).

In each column of pixel array 40, in a plan view of image sensor 1, N first vertical signal lines 50 extend and are aligned in a column direction of pixel array 40.

In each column of pixel array 40, first vertical signal line 50A includes node 2AA connected to a node of second semiconductor chip 12 (here, node 2AB, which is described later). Here, by way of example, but not of limitation, first vertical signal line 50A includes node 2AA in an end portion closer to first vertical signal line 50B.

In each column of pixel array 40, first vertical signal line 50B includes node 2BA connected to a node of second semiconductor chip 12 (here, node 2BB, which is described later). Here, by way of example, but not of limitation, first vertical signal line 50B includes node 2BA in an end portion closer to first vertical signal line 50A.

In each column of pixel array 40, first vertical signal line 50C includes node 2CA connected to a node of second semiconductor chip 12 (here, node 2CB, which is described later). Here, by way of example, but not of limitation, first vertical signal line 50C includes node 2CA in an end portion closer to first vertical signal line 50D.

In each column of pixel array 40, first vertical signal line 50D includes node 2DA connected to a node of second semiconductor chip 12 (here, node 2DB, which is described later). Here, by way of example, but not of limitation, first vertical signal line 50D includes node 2DA in an end portion closer to first vertical signal line 50C.

Figure 4:
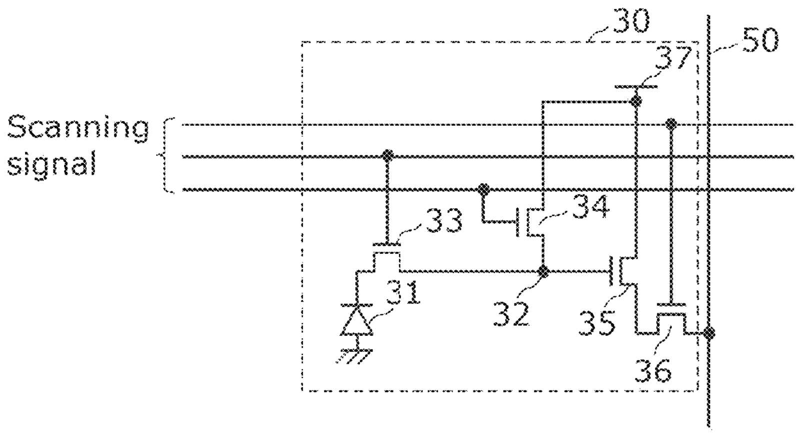
FIG. 4 is a circuit diagram illustrating a configuration of a pixel according to Embodiment 1.

FIG. 4 is a circuit diagram illustrating a configuration of pixel 30.

As illustrated in FIG. 4, pixel 30 includes photoelectric conversion unit 31, charge accumulation section 32, transfer transistor 33, reset transistor 34, amplifying transistor 35, selection transistor 36, and power supply line 37.

Pixel 30 is, for example, a back-illuminated pixel.

Photoelectric conversion unit 31 converts received light into a charge. Photoelectric conversion unit 31 is achieved as, for example, a photodiode.

Charge accumulation section 32 accumulates the charge converted by photoelectric conversion unit 31.

Transfer transistor 33 transfers the charge converted by photoelectric conversion unit 31 to charge accumulation section 32. Transfer transistor 33 is achieved as, for example, a metal-oxide-semiconductor (MOS) transistor.

Reset transistor 34 resets the charge accumulated in charge accumulation section 32. Reset transistor 34 is achieved as, for example, a MOS transistor.

Amplifying transistor 35 outputs a pixel signal corresponding to a charge amount accumulated in charge accumulation section 32. Amplifying transistor 35 is achieved as, for example, a MOS transistor.

Selection transistor 36 selects pixel 30 that will output a pixel signal to first vertical signal line 50. Selection transistor 36 is achieved as, for example, a MOS transistor.

Power supply line 37 is connected to the drain of reset transistor 34 and the drain of amplifying transistor 35.

It should be noted that if power supply line 37 is connected to the drain of amplifying transistor 35, power supply line 37 need not necessarily be also connected to the drain of reset transistor 34. In this case, the drain of reset transistor 34 is connected to another power supply line.

Figure 5:
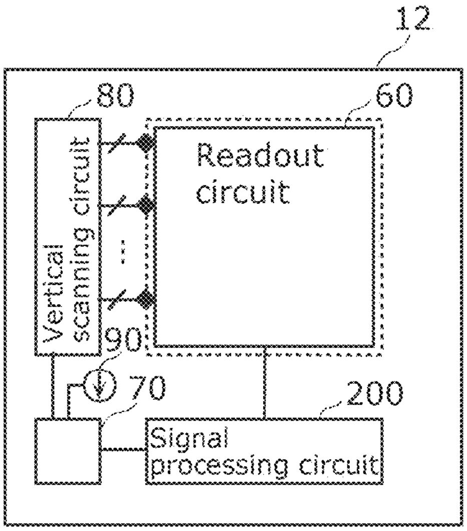
FIG. 5 is a plan view of a second semiconductor chip according to Embodiment 1.

FIG. 5 is a plan view of second semiconductor chip 12.

In FIG. 5, the constituent elements formed in second semiconductor chip 12 are illustrated by the continuous lines, whereas the area, where pixel array 40 is formed, of first semiconductor chip 11 is illustrated by the dashed line. That is, only the constituent elements illustrated by the continuous lines in FIG. 5 are formed in second semiconductor chip 12.

Here, the illustrated position of the area where pixel array 40 is formed, illustrated by the dashed line in FIG. 5 is the position of pixel array 40 projected onto second semiconductor chip 12 in a direction perpendicular to the front surface of image sensor 1 in the state in which first semiconductor chip 11 and second semiconductor chip 12 are stacked on one another.

As illustrated in FIG. 5, readout circuit 60, controller 70, vertical scanning circuit 80, reference current source 90, and signal processing circuit 200 are formed in second semiconductor chip 12.

As illustrated in FIG. 5, in the plan view of image sensor 1, pixel array 40 overlaps readout circuit 60 in the state in which first semiconductor chip 11 and second semiconductor chip 12 are stacked on one another.

It should be noted that in the explanation here, in the plan view of image sensor 1, pixel array 40 overlaps readout circuit 60 in the state in which first semiconductor chip 11 and second semiconductor chip 12 are stacked on one another. However, the structure need not necessarily be limited to the overlapping structure.

Figure 6:
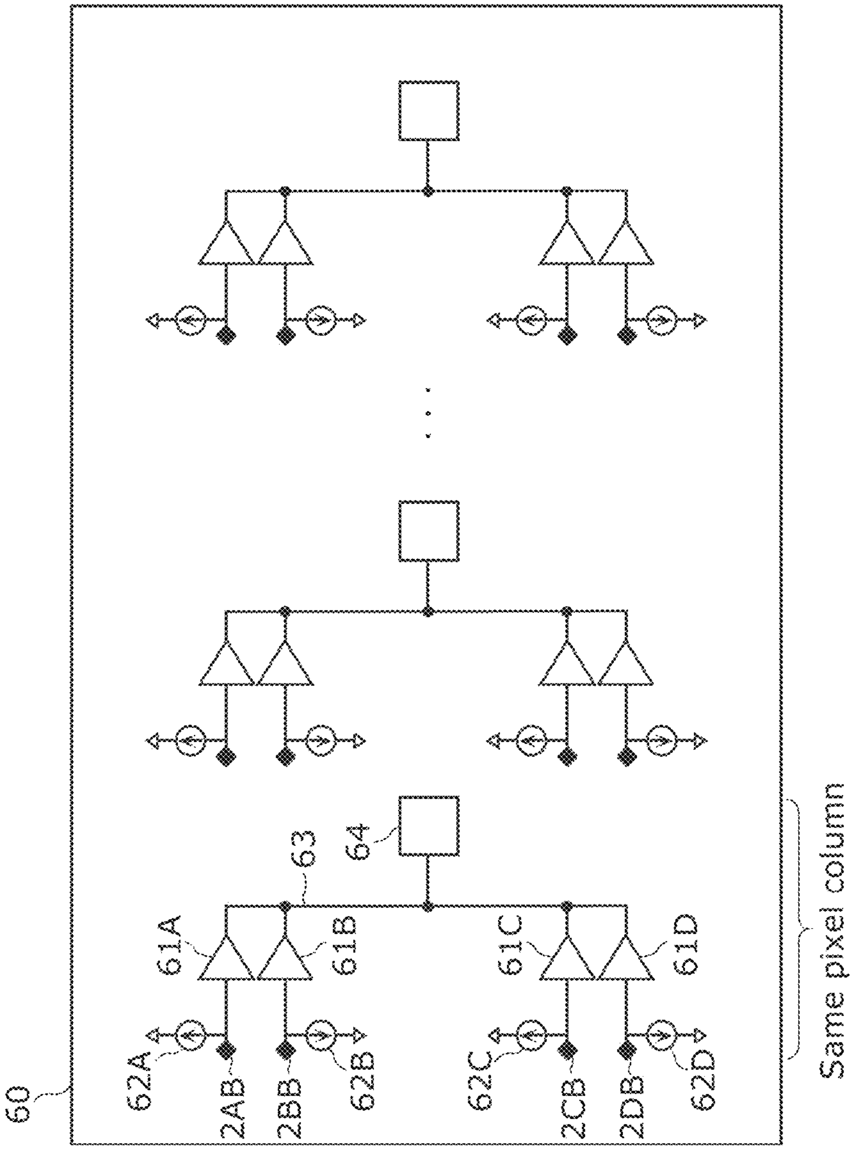
FIG. 6 is a plan view of a readout circuit according to Embodiment 1.

FIG. 6 is a plan view of readout circuit 60.

As illustrated in FIG. 6, readout circuit 60 includes, for each column of pixel array 40, N first impedance converter circuits 61 (corresponding to first impedance converter circuit 61A, first impedance converter circuit 61B, first impedance converter circuit 61C, and first impedance converter circuit 61D in FIG. 6), N current sources 62 (corresponding to current source 62A, current source 62B, current source 62C, and current source 62D), common signal line 63, and first AD converter 64.

Furthermore, readout circuit 60 includes, for each column of pixel array 40, node 2AB, node 2BB, node 2CB, and node 2DB.

First impedance converter circuit 61 is an impedance converter circuit in which output impedance is lower than input impedance, and receives a pixel signal from at least one of pixels 30 included in a corresponding column of pixel array 40.

Here, by way of example, but not of limitation, first impedance converter circuit 61 is described as a buffer.

Figure 7:
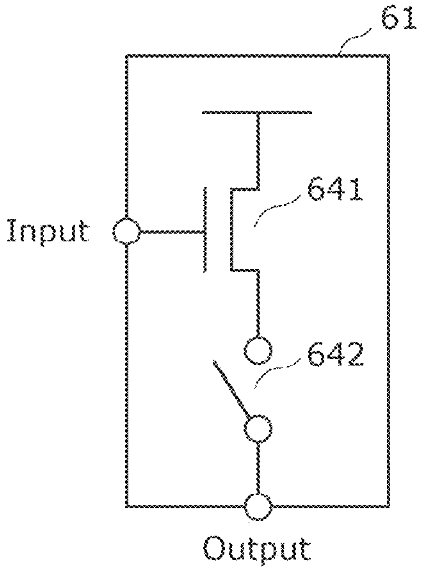
FIG. 7 is a circuit diagram illustrating a configuration example of a first impedance converter circuit according to Embodiment 1.

FIG. 7 is a circuit diagram illustrating a configuration example of first impedance converter circuit 61.

As illustrated in FIG. 7, first impedance converter circuit 61 includes output transistor 641 and switch 642.

It should be noted that first impedance converter circuit 61 may be configured as a circuit having an amplifying function.

Output transistor 641 is a MOS transistor in which the gate thereof is connected to the input and the drain thereof is connected to the output via switch 642. Output transistor 641 has a higher drive capability than that of amplifying transistor 35.

First impedance converter circuit 61 has the function of setting the output to high impedance. That is, the output of first impedance converter circuit 61 can be set to the high impedance by placing switch 642 in a nonconductive state.

Here, to set the output to high impedance means that in the state where the output of one of first impedance converter circuits 61 and the output of the other one of first impedance converter circuits 61 are shorted, the impedance of the output of the one of first impedance converter circuits 61 is set to be higher than the impedance of the output of the other one of first impedance converter circuits 61 not demonstrating the function of setting the output to high impedance.

It should be noted that when first impedance converter circuit 61 is configured as described above, a current source for driving first impedance converter circuit 61 is connected to common signal line 63.

Returning to FIG. 6, we will continue the explanation of readout circuit 60.

As illustrated in FIGS. 3 and 6, the input of first impedance converter circuit 61A is connected to first vertical signal line 50A in a corresponding column of pixel array 40 via node 2AB and node 2AA. The input of first impedance converter circuit 61B is connected to first vertical signal line 50B in a corresponding column of pixel array 40 via node 2BB and node 2BA. The input of first impedance converter circuit 61C is connected to first vertical signal line 50C in a corresponding column of pixel array 40 via node 2CB and node 2CA. The input of first impedance converter circuit 61D is connected to first vertical signal line 50D in a corresponding column of pixel array 40 via node 2DB and node 2DA.

The outputs of N first impedance converter circuits 61 are connected to first AD converter 64 via common signal line 63.

Here, in each column of pixel array 40, first impedance converter circuit 61A and first impedance converter circuit 61B in the plan view of pixel array 40 are positioned between first vertical signal line 50A and first vertical signal line 50B in the column direction of pixel array 40 in the state where first semiconductor chip 11 and second semiconductor chip 12 are stacked on one another in the plan view of image sensor 1.

Thus, in each column of pixel array 40, the distance from first vertical signal line 50A to first impedance converter circuit 61A is relatively short, and the distance from first vertical signal line 50B to first impedance converter circuit 61B is relatively short.

It should be noted that in the explanation here, first impedance converter circuit 61A and first impedance converter circuit 61B in the plan view of pixel array 40 are positioned between first vertical signal line 50A and first vertical signal line 50B in the column direction of pixel array 40 in the state where first semiconductor chip 11 and second semiconductor chip 12 are stacked on one another in the plan view of image sensor 1. However, first impedance converter circuit 61A and first impedance converter circuit 61B need not necessarily be positioned between first vertical signal line 50A and first vertical signal line 50B in the column direction of pixel array 40.

Furthermore, in each column of pixel array 40, first impedance converter circuit 61C and first impedance converter circuit 61D in the plan view of pixel array 40 are positioned between first vertical signal line 50C and first vertical signal line 50D in the column direction of pixel array 40 in the state where first semiconductor chip 11 and second semiconductor chip 12 are stacked on one another in the plan view of image sensor 1.

Thus, in each column of pixel array 40, the distance from first vertical signal line 50C to first impedance converter circuit 61C is relatively short, and the distance from first vertical signal line 50D to first impedance converter circuit 61D is relatively short.

It should be noted that in the explanation here, first impedance converter circuit 61C and first impedance converter circuit 61D in the plan view of pixel array 40 are positioned between first vertical signal line 50C and first vertical signal line 50D in the column direction of pixel array 40 in the state where first semiconductor chip 11 and second semiconductor chip 12 are stacked on one another in the plan view of image sensor 1. However, first impedance converter circuit 61C and first impedance converter circuit 61D need not necessarily be positioned between first vertical signal line 50C and first vertical signal line 50D in the column direction of pixel array 40.

Furthermore, in each column of pixel array 40, common signal line 63 in the plan view of image sensor 1 extends in the column direction of pixel array 40. Then, in the plan view of image sensor 1, the presence area in the column direction of pixel array 40 of common signal line 63 is within the presence area in the in the column direction of pixel array 40 of N first vertical signal lines 50, and the length of common signal line 63 is less than the total sum of the lengths of N first vertical signal lines 50.

Thus, in each column of pixel array 40, common signal line 63 becoming unnecessarily long is suppressed.

First AD converter 64 converts from analog to digital first impedance conversion signals output from N first impedance converter circuits 61.

Here, in each column of pixel array 40, first AD converter 64 in the plan view of pixel array 40 is positioned between (i) first impedance converter circuit 61A and first impedance converter circuit 61B and (ii) first impedance converter circuit 61C and first impedance converter circuit 61D.

Here, in each column of pixel array 40, the distances from first impedance converter circuit 61A and first impedance converter circuit 61B to first AD converter 64 are relatively short, and the distances from first impedance converter circuit 61C and first impedance converter circuit 61D to first AD converter 64 are relatively short.

It should be noted that in the explanation here, in the plan view of pixel array 40, first AD converter 64 is positioned between (i) first impedance converter circuit 61A and first impedance converter circuit 61B and (ii) first impedance converter circuit 61C and first impedance converter circuit 61D. However, the configuration need not necessarily be limited to the configuration where first AD converter 64 is positioned between (i) first impedance converter circuit 61A and first impedance converter circuit 61B and (ii) first impedance converter circuit 61C and first impedance converter circuit 61D.

Each of current sources 62 and reference current source 90, which is described later, form a current mirror circuit, and each current mirror circuit passes a current specified by the current flowing through reference current source 90.

As illustrated in FIG. 6, current source 62A is connected to first vertical signal line 50A (see FIG. 3) in a corresponding column of pixel array 40 via node 2AA and node 2AB. Current source 62B is connected to first vertical signal line 50B (see FIG. 3) in a corresponding column of pixel array 40 via node 2BA and node 2BB. Current source 62C is connected to first vertical signal line 50C (see FIG. 3) in a corresponding column of pixel array 40 via node 2CA and node 2CB. Current source 62D is connected to first vertical signal line 50D (see FIG. 3) in a corresponding column of pixel array 40 via node 2DA and node 2DB.

Returning to FIG. 5, we will continue the explanation of second semiconductor chip 12.

Vertical scanning circuit 80 outputs, for each row of pixel array 40, a vertical scanning signal for controlling pixels 30 positioned in the row.

Reference current source 90 is a current source that forms the current mirror circuits together with current sources 62 included in readout circuit 60, and uniformly specifies currents flowing through all of current sources 62 included in readout circuit 60.

It should be noted that here, reference current source 90 is described as a current source that forms a current mirror circuit together with each of current sources 62 included in readout circuit 60. However, as long as reference current source 90 is a current source that forms a current mirror circuit together with each of at least two current sources 62 among current sources 62 included in readout circuit 60, reference current source 90 need not necessarily be limited to the configuration of the current source that forms a current mirror circuit together with each of current sources 62 included in readout circuit 60. In this case, reference current source 90 uniformly specifies the currents flowing through at least two current source 62.

Signal processing circuit 200 generates an image on the basis of AD conversion signals output from first AD converters 64 included in readout circuit 60.

Controller 70 controls readout circuit 60, vertical scanning circuit 80, reference current source 90, and signal processing circuit 200.

Figure 8:
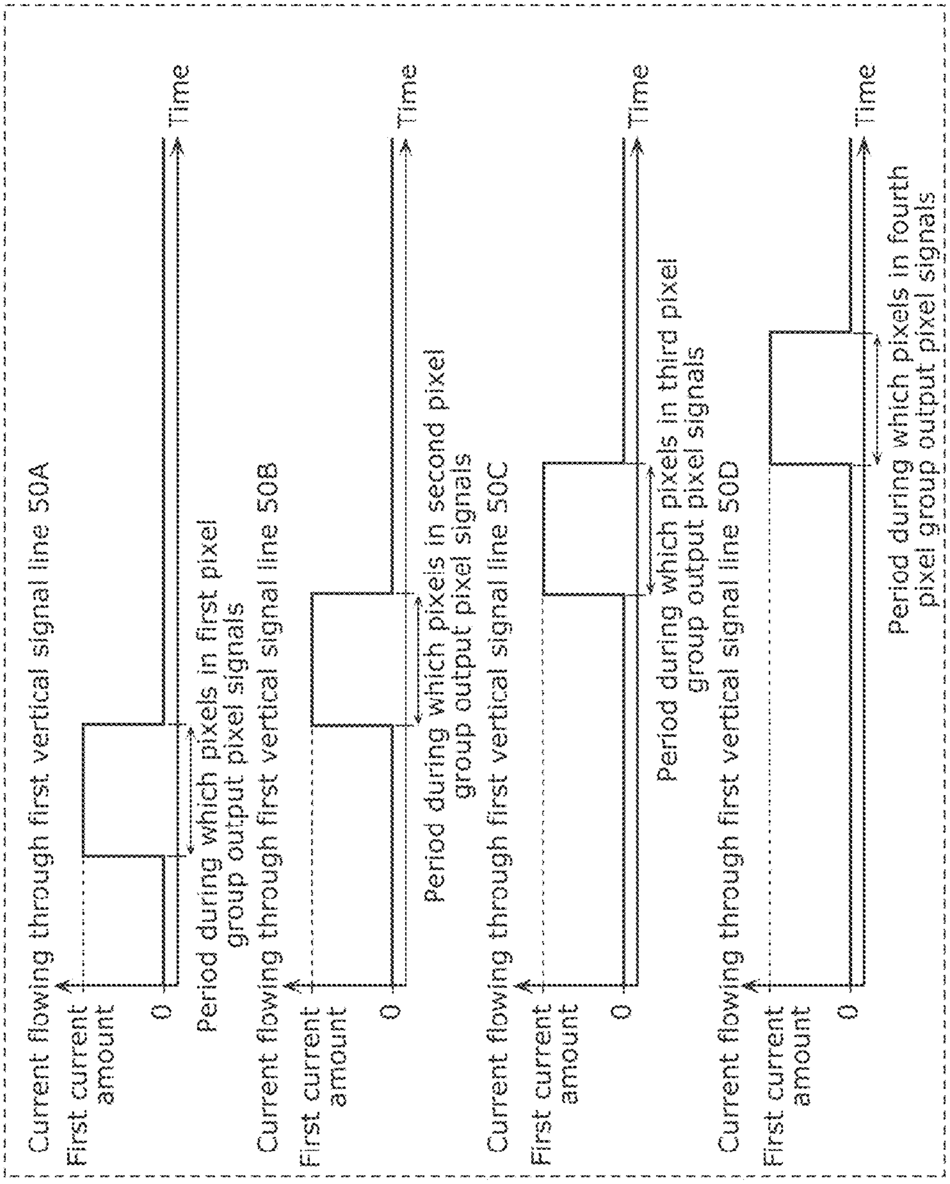
FIG. 8 presents timing charts illustrating timings at which a current is passed through a first vertical signal line by a controller according to Embodiment 1 operating, for example, a current source.

FIG. 8 presents timing charts illustrating timings at which a current is passed through first vertical signal line 50 by controller 70 controlling, for example, corresponding current source 62 in each column of pixel array 40 in order to read out a pixel signal from each pixel 30 of pixel array 40.

In FIG. 8, in the top timing chart, the vertical axis indicates the current flowing through first vertical signal line 50A, and the horizontal axis indicates the time. In the second top timing chart, the vertical axis indicates the current flowing through first vertical signal line 50B, and the horizontal axis indicates the time. In the third top timing chart, the vertical axis indicates the current flowing through first vertical signal line 50C, and the horizontal axis indicates the time. In the fourth top timing chart, the vertical axis indicates the current flowing through first vertical signal line 50D, and the horizontal axis indicates the time.

As illustrated in FIG. 8, for each column of pixel array 40, controller 70 causes current source 62 that passes a current through first vertical signal line 50 of a readout execution pixel group to enter an active state, that is, the state in which a current is passed, thereby passing a current of a first current amount through first vertical signal line 50 of the readout execution pixel group. Here, the readout execution pixel group is pixel group 100 including pixels 30 that output pixel signals. Controller 70 causes other current sources 62 to enter a non-active state, that is, the state in which a current is not passed, thereby not passing the current through first vertical signal lines 50 of pixel groups 100 except for the readout execution pixel group.

Controlling of current sources 62 in the above manner by controller 70 suppresses the power consumption of image sensor 1, compared with when the current of the first current amount is passed through all first vertical signal lines 50.

<Observations>

In image sensor 1 configured as described above, in each column of pixel array 40, pixels 30 in the column are connected to one of N first vertical signal lines 50 after division of first vertical signal line 50 by N. Thus, in comparison with the configuration where in each column of pixel array 40, pixels 30 in the column are connected to one vertical signal line, in image sensor 1 configured as described above, the wiring capacity of each first vertical signal line 50 is less than the wiring capacity of the one vertical signal line, and the number of pixels 30 connected as loads to each first vertical signal line 50 is less than the number of pixels 30 connected as loads to the one vertical signal line. Thus, it is possible to increase the readout rate at which to read out a pixel signal from pixel 30.

Furthermore, in image sensor 1 configured as described above, in each column of pixel array 40, each of N first vertical signal lines 50 is connected to first AD converter 64 via one of first impedance converter circuits 61. As such, in comparison with the configuration where in each column of pixel array 40, N first vertical signal lines 50 are connected one-to-one to AD converters, in image sensor 1 configured as described above, characteristic differences that can be generated between the AD converters are less likely to be reflected in pixel signals read out from pixels 30 connected to different first vertical signal lines 50. Thus, in image sensor 1 configured as described above, the quality degradation of an image captured by the image sensor due to the occurrence of the characteristic differences between the AD converters in each column of pixel array 40 is suppressed.

Accordingly, in image sensor 1 configured as described above, it is possible to increase the readout rate at which to read out a pixel signal from pixel 30, while suppressing the quality degradation of an image to be captured.

Figure 9:
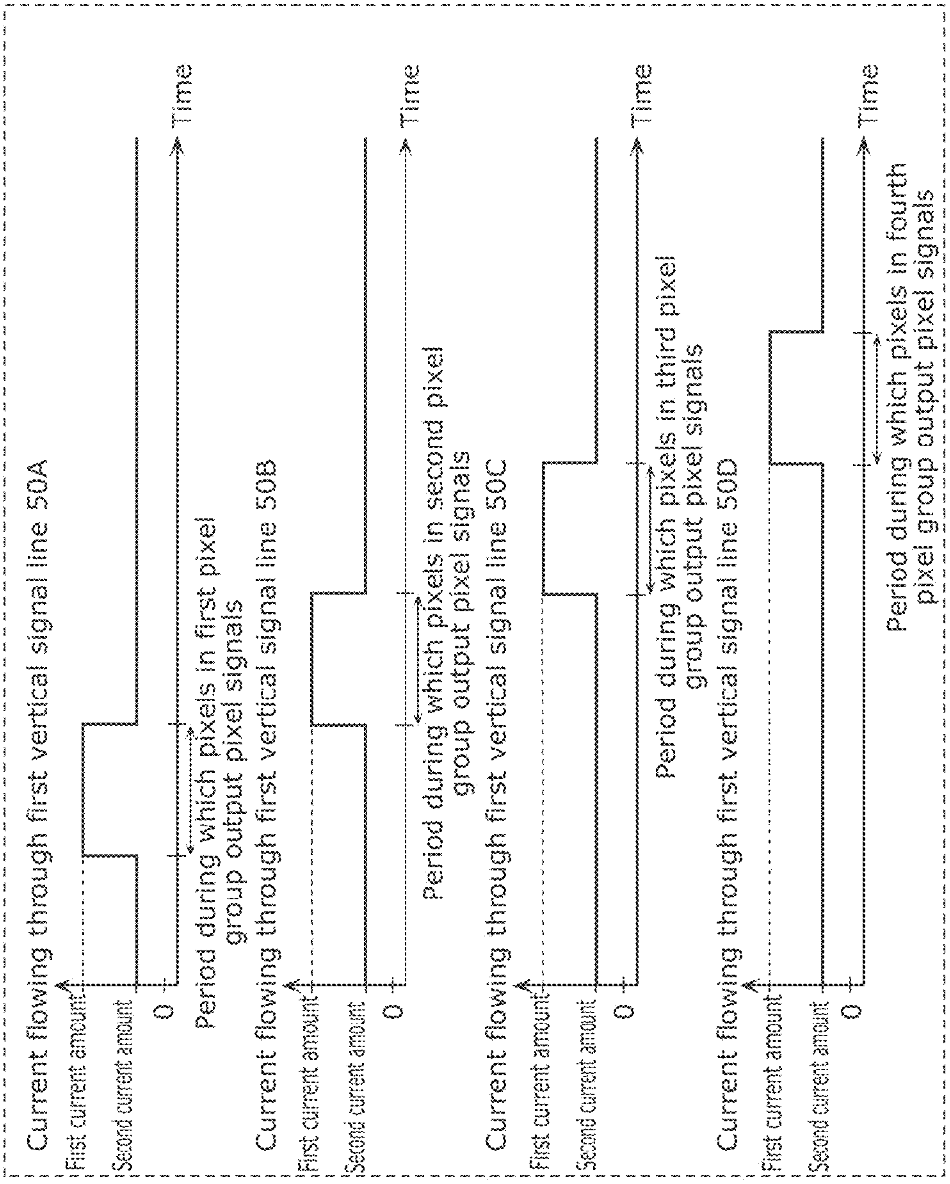
FIG. 9 presents timing charts illustrating timings at which a current is passed through a first vertical signal line by the controller according to Embodiment 1 operating, for example, a current source.
Figure 10:
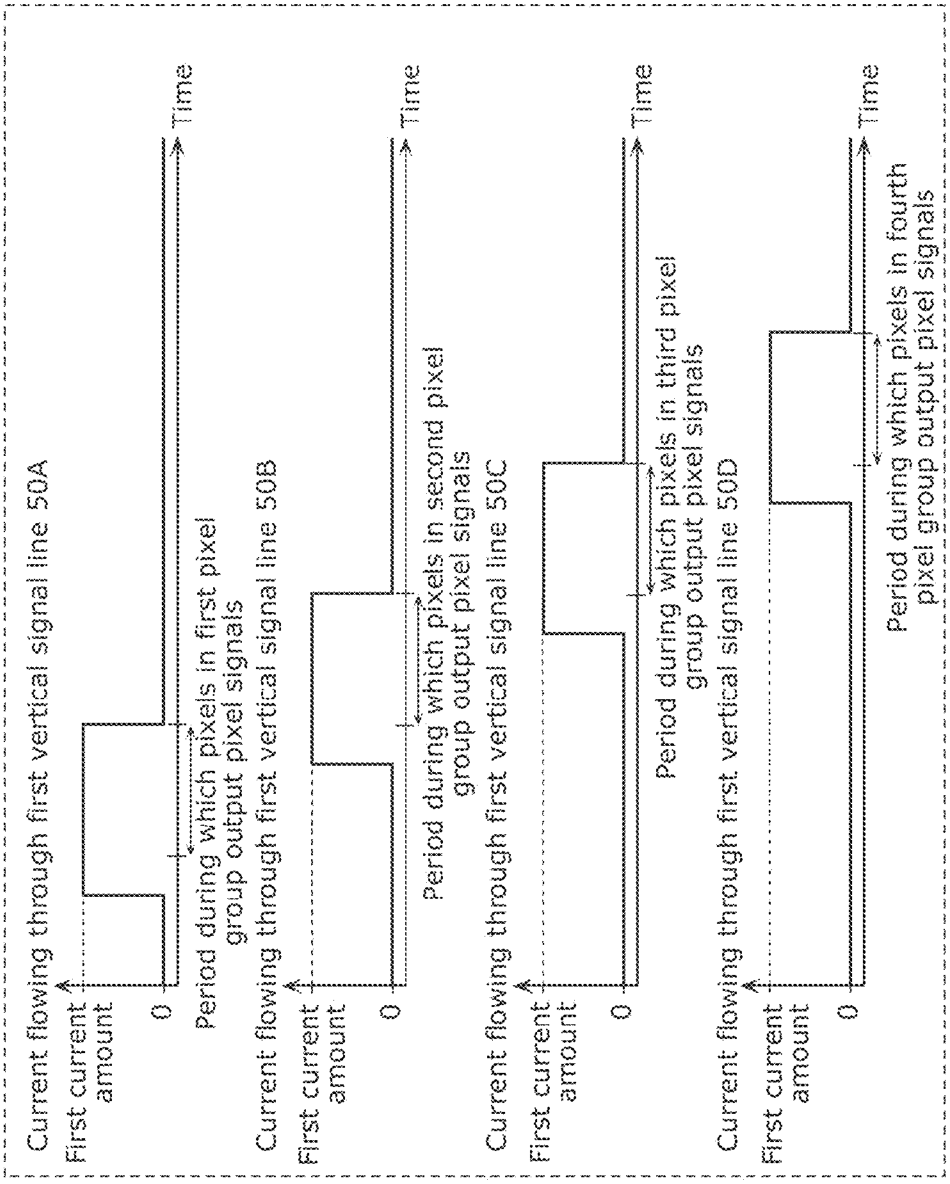
FIG. 10 presents timing charts illustrating timings at which a current is passed through a first vertical signal line by the controller according to Embodiment 1 operating, for example, a current source.
Figure 11:
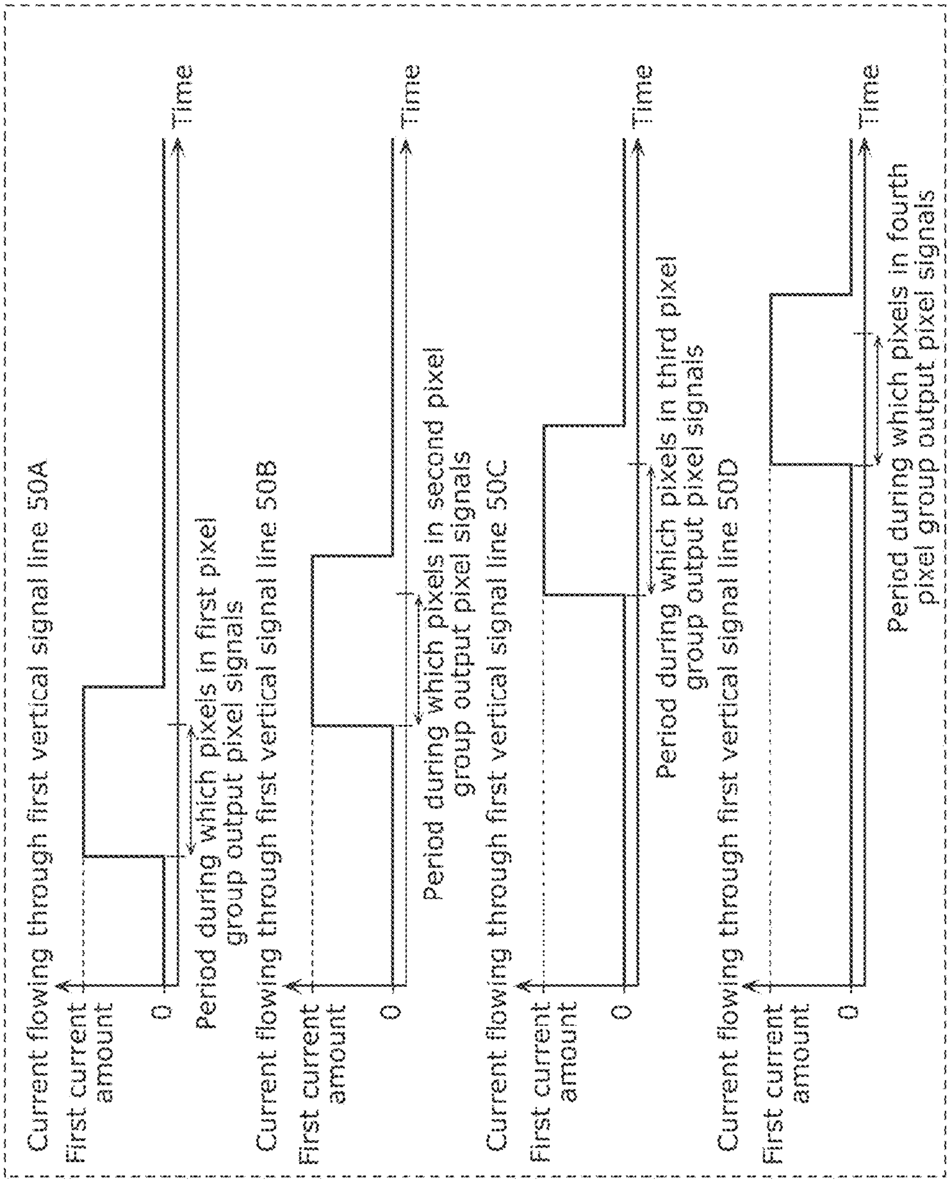
FIG. 11 presents timing charts illustrating timings at which a current is passed through a first vertical signal line by the controller according to Embodiment 1 operating, for example, a current source.

It should be noted that in the explanation in Embodiment 1, controller 70 controls, for example, current sources 62 as illustrated in FIG. 8. However, controller 70 may control, for example, current sources 62 as illustrated in FIG. 9, which is described later. Controller 70 may control, for example, current sources 62 as illustrated in FIG. 10, which is described later. Controller 70 may control, for example, current sources 62 as illustrated in FIG. 11, which is described later.

FIG. 9 presents timing charts illustrating timings at which a current is passed through first vertical signal line 50 by controller 70 controlling, for example, corresponding current source 62 in each column of pixel array 40 in order to read out a pixel signal from each pixel 30 of pixel array 40.

In FIG. 9, in the top timing chart, the vertical axis indicates the current flowing through first vertical signal line 50A, and the horizontal axis indicates the time. In the second top timing chart, the vertical axis indicates the current flowing through first vertical signal line 50B, and the horizontal axis indicates the time. In the third top timing chart, the vertical axis indicates the current flowing through first vertical signal line 50C, and the horizontal axis indicates the time. In the fourth top timing chart, the vertical axis indicates the current flowing through first vertical signal line 50D, and the horizontal axis indicates the time.

As illustrated in FIG. 9, for each column of pixel array 40, controller 70 causes current source 62 that passes a current through first vertical signal line 50 of a readout execution pixel group to enter a first active state, that is, the state in which a current of a first current amount is passed, thereby passing the current of the first current amount through first vertical signal line 50 of the readout execution pixel group. Here, the readout execution pixel group is pixel group 100 including pixels 30 that output pixel signals. Controller 70 causes other current sources 62 to enter a second active state, that is, the state in which a current of a second current amount less than the first current amount is passed, thereby passing the current of the second current amount through the first vertical signal lines of pixel groups 100 except for the readout execution pixel group.

Controlling of current sources 62 in the above manner by controller 70 suppresses the power consumption of image sensor 1, compared with when the current of the first current amount is passed through all first vertical signal lines 50.

FIG. 10 presents timing charts illustrating timings at which a current is passed through first vertical signal line 50 by controller 70 controlling, for example, corresponding current source 62 in each column of pixel array 40 in order to read out a pixel signal from each pixel 30 of pixel array 40.

In FIG. 10, in the top timing chart, the vertical axis indicates the current flowing through first vertical signal line 50A, and the horizontal axis indicates the time. In the second top timing chart, the vertical axis indicates the current flowing through first vertical signal line 50B, and the horizontal axis indicates the time. In the third top timing chart, the vertical axis indicates the current flowing through first vertical signal line 50C, and the horizontal axis indicates the time. In the fourth top timing chart, the vertical axis indicates the current flowing through first vertical signal line 50D, and the horizontal axis indicates the time.

As illustrated in FIG. 10, controller 70 performs (1), (2), and (3) for each column of pixel array 40. In (1), controller 70 causes current source 62 that passes a current through first vertical signal line 50 of a readout execution pixel group to enter an active state, that is, the state in which a current is passed, thereby passing the current of the first current amount through first vertical signal line 50 of the readout execution pixel group. Here, the readout execution pixel group is pixel group 100 including pixels 30 that output pixel signals. In (2), controller 70 causes current source 62 that passes a current through first vertical signal line 50 of in a readout pre-execution pixel group to enter the active state before pixels 30 included in the readout pre-execution pixel group start outputting pixel signals. By doing so, the current of the first current amount is passed through first vertical signal line 50 of the readout pre-execution pixel group before pixels 30 included in the readout pre-execution pixel group start outputting the pixel signals. Here, the readout pre-execution pixel group is pixel group 100 including pixels 30 that will output the pixel signals following the output of pixels 30 included in the readout execution pixel group. In (3), controller 70 causes current sources 62 except for current source 62 that passes the current through first vertical signal line 50 of the readout execution pixel group and current source 62 that passes the current through first vertical signal line 50 of the readout pre-execution pixel group, to enter a non-active state, that is, the state in which a current is not passed. By doing so, a current is not passed through first vertical signal lines 50 of pixel groups 100 except for the readout execution pixel group and the readout pre-execution pixel group.

Controlling of current sources 62 in the above manner by controller 70 suppresses the power consumption of image sensor 1, compared with when the current of the first current amount is passed through all first vertical signal lines 50.

Furthermore, in general, if, immediately after current source 62 is changed from the non-active state to the active state, a pixel signal is read out from pixel 30 by using first vertical signal line 50 through which a current is passed by current source 62 mentioned above, it may not be able to read out the pixel signal with high accuracy.

By contrast, by controller 70 controlling current source 62 in the above manner, in each column of pixel array 40, current source 62 that passes a current through first vertical signal line 50 of the readout pre-execution pixel group is changed from the non-active state to the active state before pixels 30 included in the readout pre-execution pixel group start outputting the pixel signals.

Thus, by controller 70 controlling current source 62 in the above manner, when a pixel signal is read out from pixel 30, it is possible to suppress the situation of not being able to read out the pixel signal with high accuracy.

FIG. 11 presents timing charts illustrating timings at which a current is passed through first vertical signal line 50 by controller 70 controlling, for example, corresponding current source 62 in each column of pixel array 40 in order to read out a pixel signal from each pixel 30 of pixel array 40.

In FIG. 11, in the top timing chart, the vertical axis indicates the current flowing through first vertical signal line 50A, and the horizontal axis indicates the time. In the second top timing chart, the vertical axis indicates the current flowing through first vertical signal line 50B, and the horizontal axis indicates the time. In the third top timing chart, the vertical axis indicates the current flowing through first vertical signal line 50C, and the horizontal axis indicates the time. In the fourth top timing chart, the vertical axis indicates the current flowing through first vertical signal line 50D, and the horizontal axis indicates the time.

As illustrated in FIG. 11, controller 70 performs (1), (2), and (3) for each column of pixel array 40. In (1), controller 70 causes current source 62 that passes a current through first vertical signal line 50 of a readout execution pixel group to enter an active state, that is, the state in which a current is passed, thereby passing the current of the first current amount through first vertical signal line 50 of the readout execution pixel group. Here, the readout execution pixel group is pixel group 100 including pixels 30 that output pixel signals. In (2), controller 70 causes current source 62 that passes a current through first vertical signal line 50 of a readout post-execution pixel group to remain in the active state for a certain period of time even after pixels 30 included in the readout post-execution pixel group finish outputting pixel signals. This keeps the current of the first current amount flowing through first vertical signal line 50 of the readout post-execution pixel group for the certain period of time even after pixels 30 included in the readout post-execution pixel group finish outputting the pixel signals. Here, the readout post-execution pixel group is pixel group 100 including pixels 30 that have output the pixel signals preceding the output of pixels 30 included in the readout execution pixel group. In (3), controller 70 causes current sources 62 except for current source 62 that passes the current through first vertical signal line 50 of the readout execution pixel group and current source 62 that passes the current through first vertical signal line 50 of the readout post-execution pixel group, to enter a non-active state, that is, the state in which a current is not passed. By doing so, a current is not passed through first vertical signal lines 50 of pixel groups 100 except for the readout execution pixel group and the readout post-execution pixel group.

Controlling of current sources 62 in the above manner by controller 70 suppresses the power consumption of image sensor 1, compared with when the current of the first current amount is passed through all first vertical signal lines 50.

Furthermore, in general, when current source 62 that passes a current through first vertical signal line 50 in a column of pixel array 40 is changed from the active state to the non-active state, a negative effect may be exerted on a current flowing through first vertical signal line 50 in another column adjacent to the column. Then, it may not be able to read out pixel signals with high accuracy from pixels 30 connected to first vertical signal line 50 in the adjacent column.

By contrast, by controller 70 controlling current source 62 in the above manner, even if in a certain period of time after completion of readout of pixel signals from pixels 30 included in a readout execution pixel group in a column of pixel array 40, pixels 30 in which readout of pixel signals continues are present in another column adjacent to the column, current source 62 that passes a current through first vertical signal line 50 of the readout execution pixel group remains in the active state during the certain period of time.

Thus, by controller 70 controlling current source 62 in the above manner, even if in the certain period of time after the completion of readout of the pixel signals from pixels 30 included in the readout execution pixel group in the above-mentioned column of pixel array 40, pixels 30 in which readout of the pixel signals continues are present in another column adjacent to the column, it is possible to suppress the situation of not being able to read out the pixel signals from pixels 30 in the adjacent column with high accuracy.

Variation 1

Hereinafter, an image sensor according to Variation 1 configured by changing a part of the configuration of image sensor 1 according to Embodiment 1 is described.

Hereinafter, constituent elements in the image sensor according to Variation 1 that are similar to those of image sensor 1 according to Embodiment 1 are assigned the same reference symbols as those already described, and detailed descriptions thereof will be omitted, with the descriptions focusing on the differences from image sensor 1.

The image sensor according to Variation 1 is configured by changing readout circuit 60 in image sensor 1 according to Embodiment 1 to a readout circuit according to Variation 1.

Figure 12:
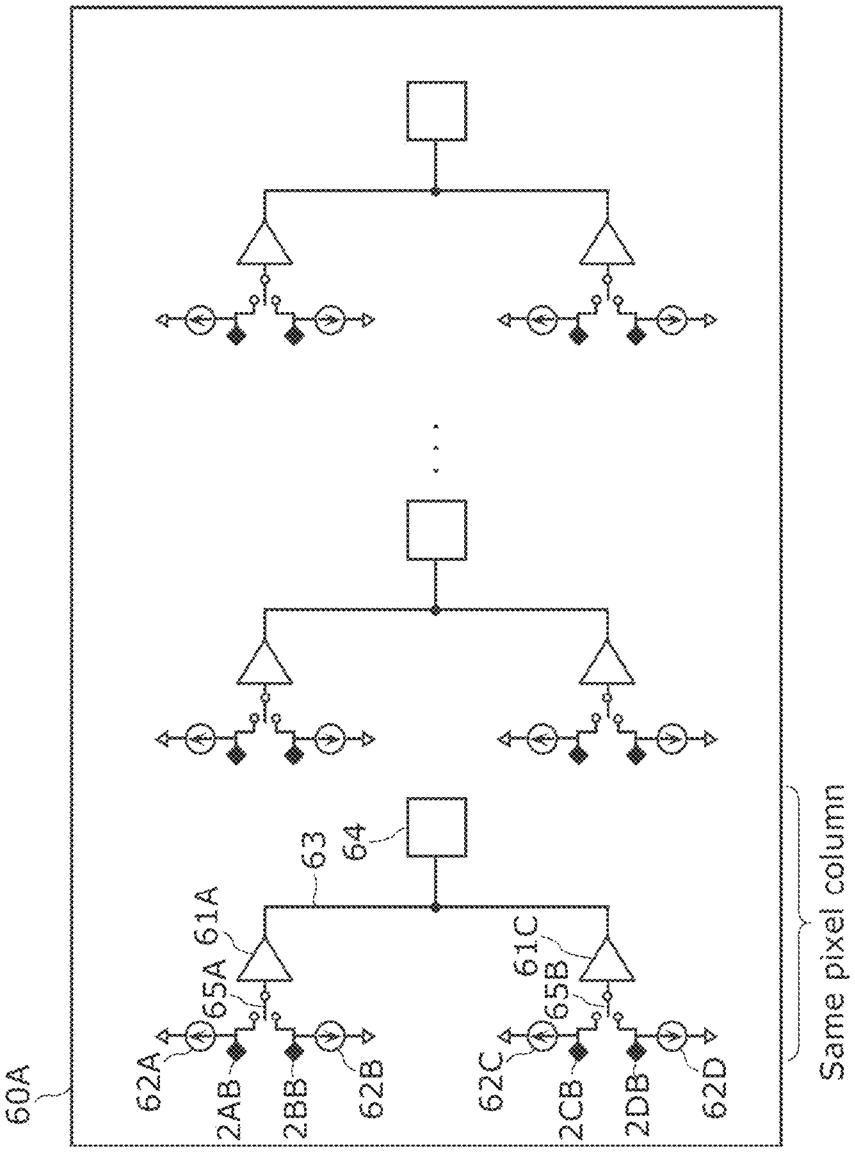
FIG. 12 is a plan view of a readout circuit according to Variation 1.

FIG. 12 is a plan view of readout circuit 60A according to Variation 1.

As illustrated in FIG. 12, readout circuit 60A is configured by removing, for each column of pixel array 40, first impedance converter circuit 61B and first impedance converter circuit 61D from readout circuit 60 according to Embodiment 1, and adding switch 65A and switch 65B.

Switch 65A selectively switches between node 2AB and node 2BB, and connects the input of first impedance converter circuit 61A to either node 2AB or node 2BB.

Switch 65B selectively switches between node 2CB and node 2DB, and connects the input of first impedance converter circuit 61C to either node 2CB or node 2DB.

<Observations>

In the image sensor according to Variation 1 configured as described above, first impedance converter circuit 61A can be shared by first vertical signal line 50A and first vertical signal line 50B included in first pixel group 100A and second pixel group 100B adjacent to each other in a column direction in each column of pixel array 40.

In the image sensor according to Variation 1 configured as described above, first impedance converter circuit 61B can be shared by first vertical signal line 50C and first vertical signal line 50D included in third pixel group 100C and fourth pixel group 100D adjacent to each other in the column direction in each column of pixel array 40.

Variation 2

Hereinafter, an image sensor according to Variation 2 configured by changing a part of the configuration of the image sensor according to Variation 1 is described.

Hereinafter, constituent elements in the image sensor according to Variation 2 that are similar to those of the image sensor according to Variation 1 are assigned the same reference symbols as those already described, and detailed descriptions thereof will be omitted, with the descriptions focusing on the differences from the image sensor according to Variation 1.

The image sensor according to Variation 2 is configured by changing readout circuit 60A in the image sensor according to Variation 1 to a readout circuit according to Variation 2.

Figure 13:
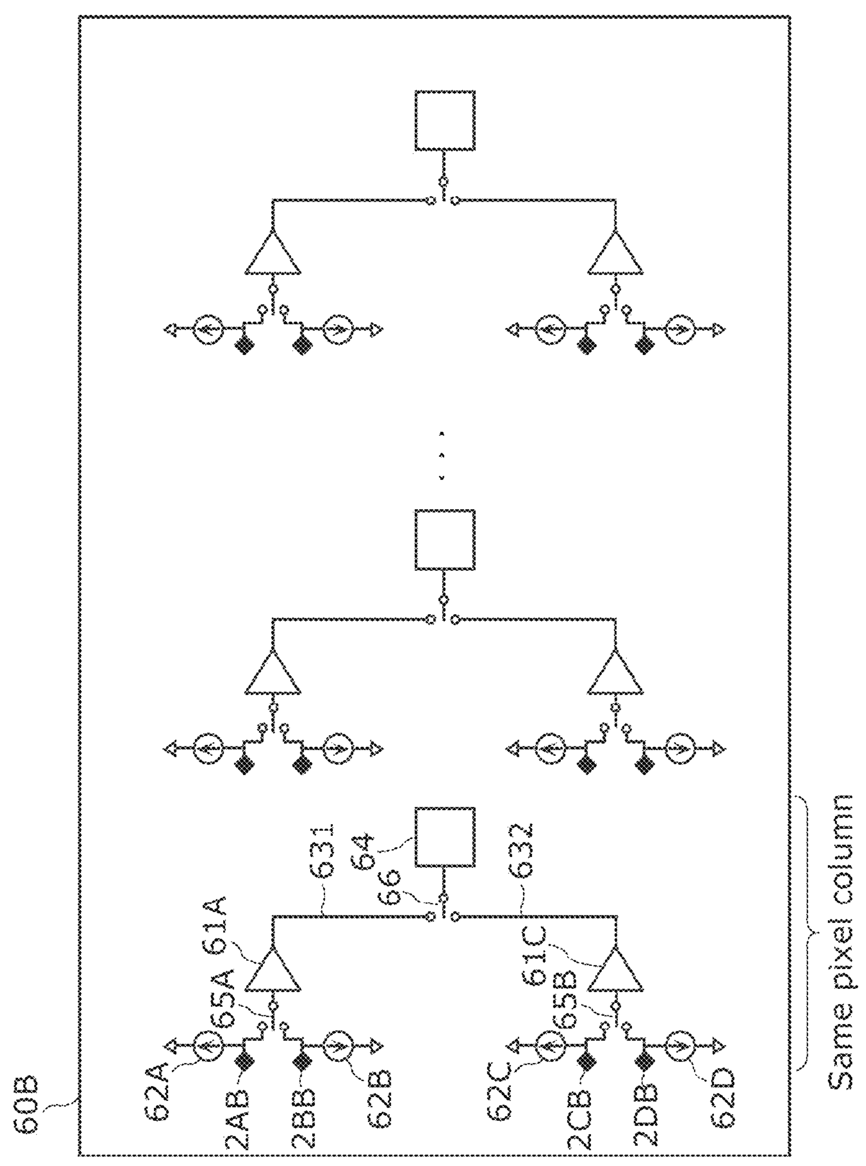
FIG. 13 is a plan view of a readout circuit according to Variation 2.

FIG. 13 is a plan view of readout circuit 60B according to Variation 2.

As illustrated in FIG. 13, readout circuit 60B is configured by removing, for each column of pixel array 40, common signal line 63 from readout circuit 60A according to Variation 1 and adding first common signal line 631, second common signal line 632, and switch 66.

The output of first impedance converter circuit 61A is connected to one of the inputs of switch 66 via first common signal line 631, and the output of first impedance converter circuit 61C is connected to the other input of switch 66 via second common signal line 632.

Switch 66 selectively switches between first common signal line 631 and second common signal line 632, and connects the input of first AD converter 64 to either first common signal line 631 or second common signal line 632.

<Observations>

In the image sensor according to Variation 2 configured as described above, the load capacity to be driven by the output of first impedance converter circuit 61A and the load capacity to be driven by the output of first impedance converter circuit 61C in each column of pixel array 40 can be decreased, compared with the image sensor according to Variation 1. Thus, in the image sensor according to Variation 2, it is possible to further increase the readout rate at which to read out a pixel signal from pixel 30.

Variation 3

Hereinafter, an image sensor according to Variation 3 configured by changing a part of the configuration of image sensor 1 according to Embodiment 1 is described.

Hereinafter, constituent elements in the image sensor according to Variation 3 that are similar to those of image sensor 1 according to Embodiment 1 are assigned the same reference symbols as those already described, and detailed descriptions thereof will be omitted, with the descriptions focusing on the differences from image sensor 1.

The image sensor according to Variation 3 is configured by changing pixels 30, pixel array 40, readout circuit 60, and controller 70 in image sensor 1 according to Embodiment 1 to pixels, a pixel array, a readout circuit, and a controller according to Variation 3, respectively.

Figure 14:
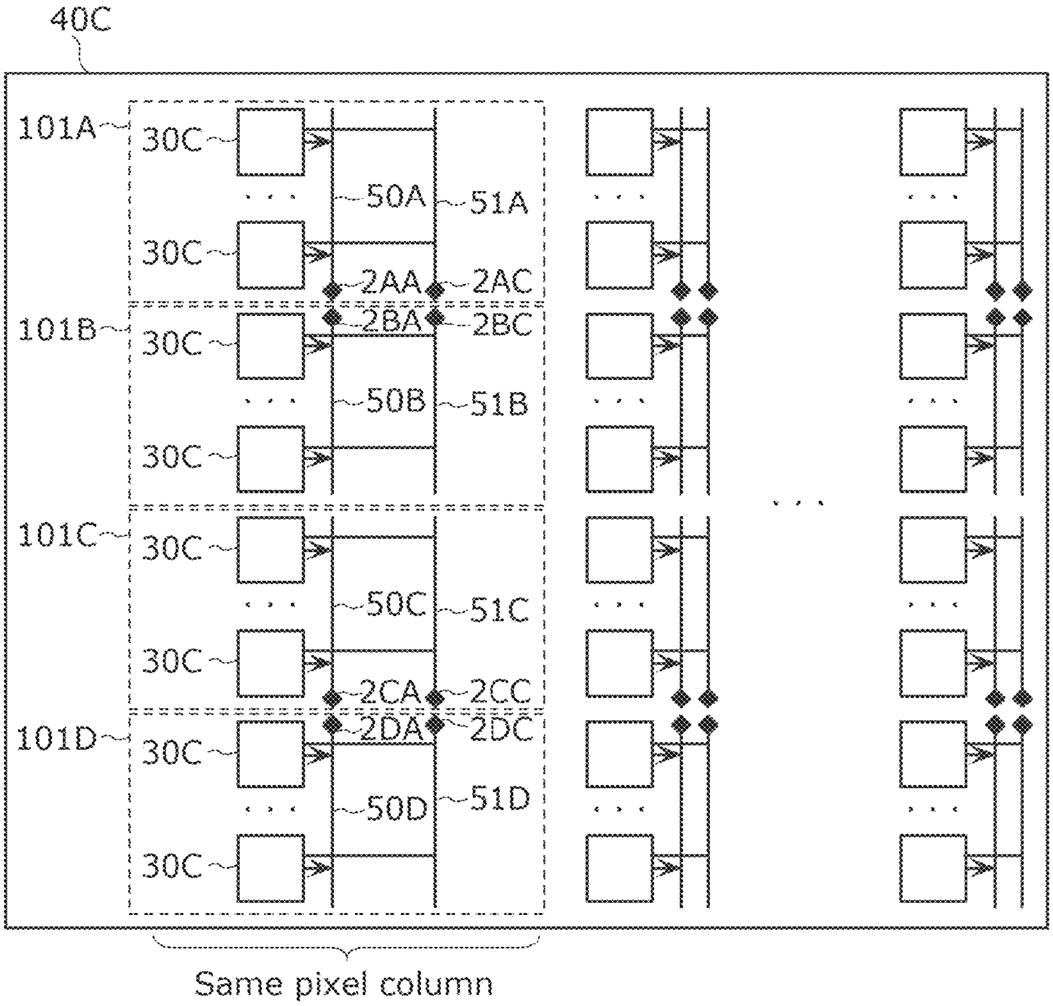
FIG. 14 is a plan view of a pixel array according to Variation 3.

FIG. 14 is a plan view of pixel array 40C according to Variation 3.

As illustrated in FIG. 14, pixel array 40C is configured by changing N pixel groups 100 in pixel array 40 according to Embodiment 1 to N pixel groups 101 (corresponding to first pixel group 101A, second pixel group 101B, third pixel group 101C, and fourth pixel group 101D in FIG. 14).

Each of N pixel groups 101 is configured by changing pixels 30 in each of N pixel groups 100 to pixels 30C and adding power supply line 51 (corresponding to power supply line 51A, power supply line 51B, power supply line 51C, power supply line 51D in FIG. 14).

Figure 15:
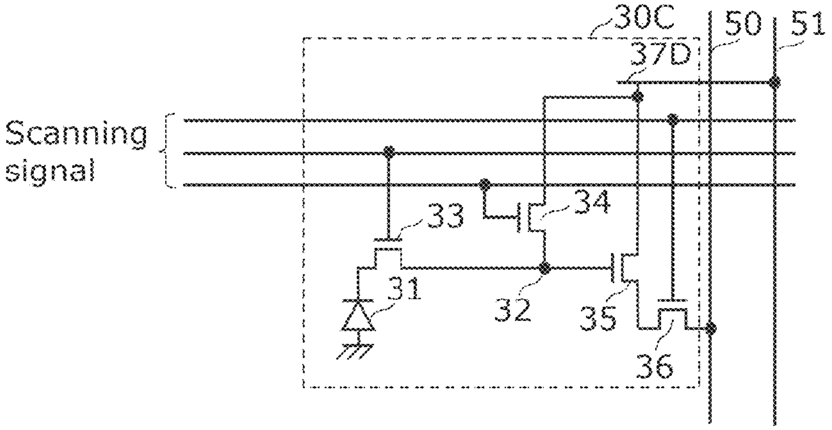
FIG. 15 is a circuit diagram illustrating a pixel configuration according to Variation 3.

FIG. 15 is a circuit diagram illustrating a configuration of pixel 30C according to Variation 3.

As illustrated in FIG. 15, pixel 30C is configured by changing power supply line 37 according to Embodiment 1 to power supply line 37D.

Power supply line 37D is connected to power supply line 51 included in pixel group 101 including pixels 30C.

Returning to FIG. 14, we will continue the explanation of pixel array 40C.

In each column of pixel array 40C, power supply line 51A is connected to power supply lines 37D of pixels 30C included in first pixel group 101A, and includes node 2AC connected to a node of second semiconductor chip 12 (here, node 2AD, which is described later).

In each column of pixel array 40C, power supply line 51B is connected to power supply lines 37D of pixels 30C included in second pixel group 101B, and includes node 2BC connected to a node of second semiconductor chip 12 (here, node 2BD, which is described later).

In each column of pixel array 40C, power supply line 51C is connected to power supply lines 37D of pixels 30C included in third pixel group 101C, and includes node 2CC connected to a node of second semiconductor chip 12 (here, node 2CD, which is described later).

In each column of pixel array 40C, power supply line 51D is connected to power supply lines 37D of pixels 30C included in fourth pixel group 101D, and includes node 2DC connected to a node of second semiconductor chip 12 (here, node 2DD, which is described later).

Figure 16:
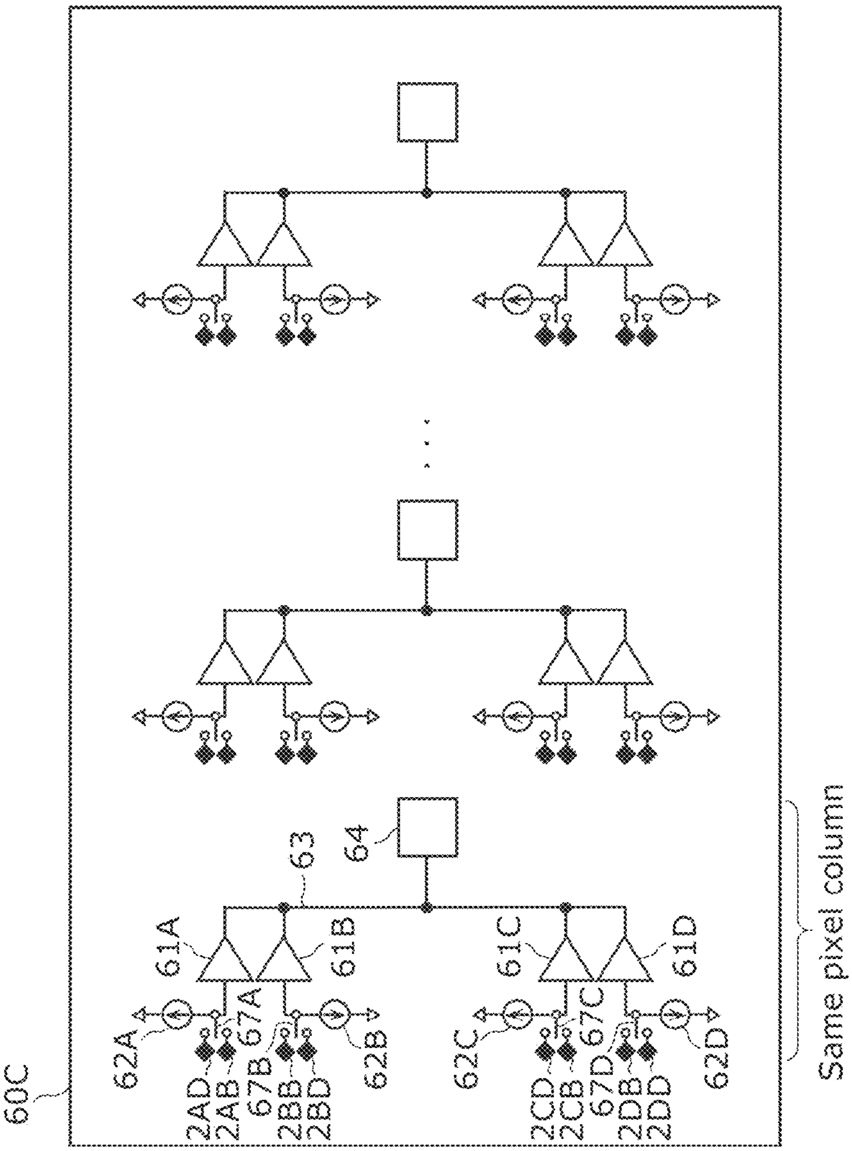
FIG. 16 is a plan view of a readout circuit according to Variation 3.

FIG. 16 is a plan view of readout circuit 60C according to Variation 3.

As illustrated in FIG. 16, readout circuit 60C is configured by adding, for each column of pixel array 40, switch 67A, switch 67B, switch 67C, switch 67D, node 2AD, node 2BD, node 2CD, and node 2DD to readout circuit 60 according to Embodiment 1.

Switch 67A selectively switches between node 2AB and node 2AD, and connects the input of first impedance converter circuit 61A and current source 62A to either node 2AB or node 2AD.

Switch 67B selectively switches between node 2BB and node 2BD, and connects the input of first impedance converter circuit 61B and current source 62B to either node 2BB or node 2BD.

Switch 67C selectively switches between node 2CB and node 2CD, and connects the input of first impedance converter circuit 61C and current source 62C to either node 2CB or node 2CD.

Switch 67D selectively switches between node 2DB and node 2DD, and connects the input of first impedance converter circuit 61D and current source 62D to either node 2DB or node 2DD.

For each column of pixel array 40, the controller according to Variation 3 causes current source 62 that passes a current through power supply line 51 connected to pixels 30C included in a readout pre-execution pixel group to enter an active state before pixels 30C included in the readout pre-execution pixel group start outputting pixel signals, thereby passing a current through power supply lines 37 of pixels 30C included in the readout pre-execution pixel group before pixels 30C included in the readout pre-execution pixel group start outputting the pixel signals. Here, the readout pre-execution pixel group is pixel group 100 including pixels 30C that will output the pixel signals following output of pixels 30C included in a readout execution pixel group, the readout execution pixel group being pixel groups 100 including pixels 30C that output pixel signals. The controller causes other current sources 62 to enter a non-active state, thereby not passing, through power supply lines 37 of pixels 30C included in pixel groups 100 except for the readout pre-execution pixel group, a current other than the current that is passed during operation of pixels 30C included in pixel groups 100 except for the readout pre-execution pixel group.

Here, to cause current source 62 that passes a current through power supply line 51 to enter the active state means to control switch 67 connected to corresponding current source 62 to lead to a state in which corresponding power supply line 51 and corresponding current source 62 are connected to each other.

Furthermore, here, to cause current source 62 that passes a current through power supply line 51 to enter a non-active state means to control switch 67 connected to corresponding current source 62 to lead to a state in which corresponding power supply line 51 and corresponding current source 62 are not connected to each other.

<Observations>

In general, a voltage difference equivalent to a voltage drop amount due to an IR drop caused according to the amount of flowing current occurs between a power supply voltage supplied to pixels 30C in a state in which a current is not flowing through power supply line 51 connected to pixels 30C mentioned above and a power supply voltage supplied to pixels 30C in a state in which a current is flowing through power supply line 51 connected to pixels 30C mentioned above. Furthermore, a difference in pixel signals to be read out occurs between when a pixel signal is read out from pixel 30C in a state in which an IR drop is not being caused and when a pixel signal is read out from pixel 30C in a state in which an IR drop is being caused.

By contrast, in the image sensor according to Variation 3 configured as described above, in each column, a current starts flowing through power supply line 51 connected to pixels 30C included in the readout pre-execution pixel group before pixels 30C included in the readout pre-execution pixel group start outputting pixel signals. Thus, in the image sensor according to Variation 3 configured as described above, in each column, an IR drop is expected to occur by the time pixels 30C included in the readout pre-execution pixel group start outputting the pixel signals. Thus, in the image sensor according to Variation 3 configured as described above, when a pixel signal is read out from pixel 30C, it is possible to suppress the situation of not being able to read out the pixel signal with high accuracy depending on whether there is the IR drop.

It should be noted that in Variation 3, the controller according to Variation 3 may perform the operation described below instead of performing the operation described above.

That is, for each column of pixel array 40, the controller according to Variation 3 causes current source 62 that passes a current through power supply line 51 connected to pixels 30C included in a readout post-execution pixel group to remain in the active state for a certain period of time even after pixels 30C included in the readout post-execution pixel group finish outputting pixel signals. This keeps a current flowing through power supply lines 37 of pixels 30C included in the readout post-execution pixel group for the certain period of time even after pixels 30C included in the readout post-execution pixel group finish outputting the pixel signals. Here, the readout post-execution pixel group is pixel group 100 including pixels 30C that have output the pixel signals preceding output of pixels 30C included in a readout execution pixel group, the readout execution pixel group being pixel group 100 including pixels 30C that output pixel signals. The controller causes other current sources 62 to enter a non-active state, thereby not passing, through power supply lines 37 of pixels 30C included in pixel groups 100 except for the readout post-execution pixel group, a current other than the current that is passed during operation of pixels 30C included in pixel groups 100 except for the readout post-execution pixel group.

In general, when in a column, the state changes from the state in which a current is flowing through pixels 30C to the state in which the current is not flowing through pixels 30C, the voltage of power supply line 51 connected to pixels 30C in another column adjacent to the column may change. In some cases, pixel signals cannot be read out with high accuracy from pixels 30C included in the adjacent column due to the change in the voltage.

By contrast, in the image sensor according to Variation 3 configured as described above, even if in the certain period of time after the completion of readout of pixel signals from pixels 30C included in the readout execution pixel group in a column, pixels 30C in which readout of pixel signals continues are present in another column adjacent to the column, the power supply line connected to pixels 30C included in the readout execution pixel group in the column remains in the state in which the current is flowing. Thus, in the image sensor according to Variation 3 configured as described above, even if in the certain period of time after the completion of readout of the pixel signals from pixels 30C included in the readout execution pixel group in the column, pixels 30C in which readout of pixel signals continues are present in another column adjacent to the column, it is possible to suppress the situation of not being able to read out pixel signals with high accuracy from pixels 30C in the adjacent column.

Variation 4

Hereinafter, an image sensor according to Variation 4 configured by changing a part of the configuration of the image sensor according to Variation 2 is described.

Hereinafter, constituent elements in the image sensor according to Variation 4 that are similar to those of the image sensor according to Variation 2 are assigned the same reference symbols as those already described, and detailed descriptions thereof will be omitted, with the descriptions focusing on the differences from the image sensor according to Variation 2.

The image sensor according to Variation 4 is configured by changing readout circuit 60B in the image sensor according to Variation 2 to a readout circuit according to Variation 4.

Figure 17:
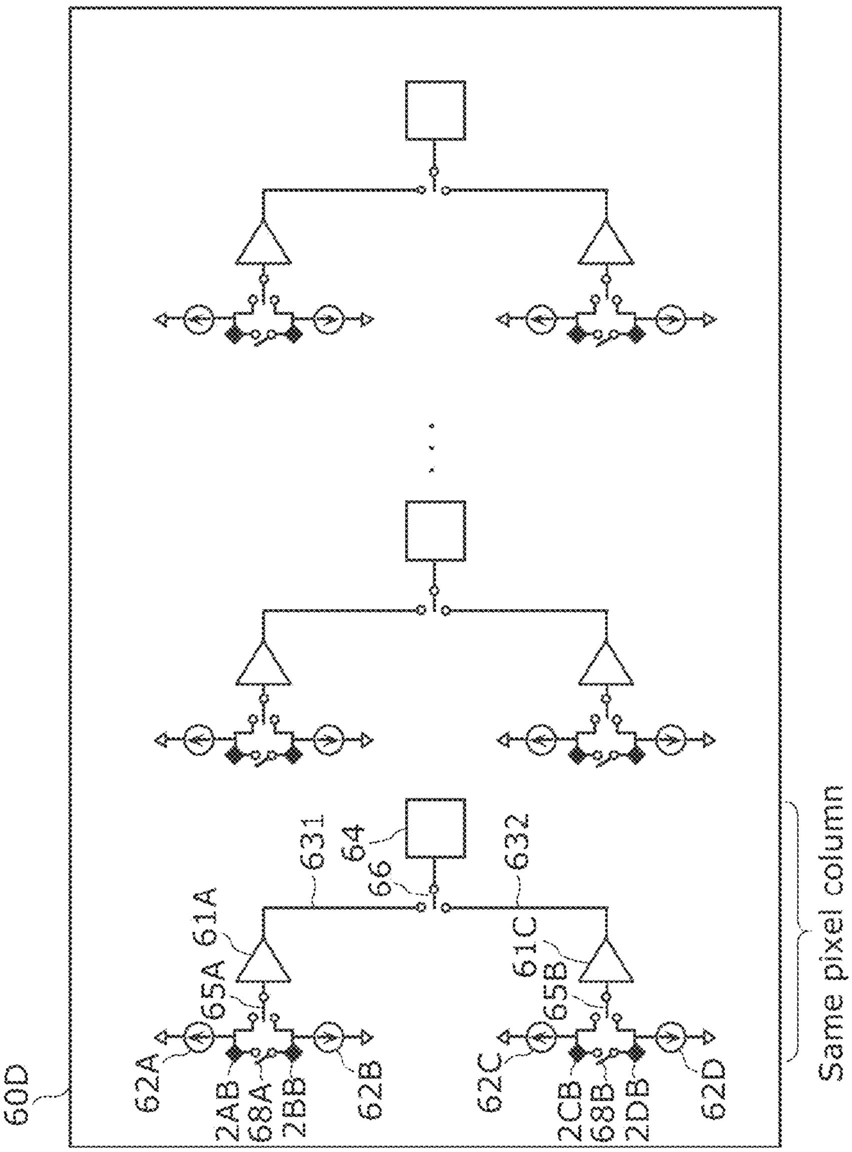
FIG. 17 is a plan view of a readout circuit according to Variation 4.

FIG. 17 is a plan view of readout circuit 60D according to Variation 4.

As illustrated in FIG. 17, readout circuit 60D is configured by adding, for each column of pixel array 40, switch 68A and switch 68B to readout circuit 60B according to Variation 2.

Switch 68A switches between a conductive state in which node 2AB and node 2BB are electrically connected and a nonconductive state in which in node 2AB and node 2BB are not electrically connected. That is, switch 68A switches between a conductive state in which first vertical signal line 50A included in first pixel group 100A and first vertical signal line 50B included in second pixel group 100B are electrically connected and a nonconductive state in which first vertical signal line 50A included in first pixel group 100A and first vertical signal line 50B included in second pixel group 100B are not electrically connected.

Switch 68B switches between a conductive state in which node 2CB and node 2DB are electrically connected and a nonconductive state in which node 2CB and node 2DB are not electrically connected. That is, switch 68B switches between a conductive state in which first vertical signal line 50C included in third pixel group 100C and first vertical signal line 50D included in fourth pixel group 100D are electrically connected and a nonconductive state in which first vertical signal line 50C included in third pixel group 100C and first vertical signal line 50D included in fourth pixel group 100D are not electrically connected.

<Observations>

In the image sensor according to Variation 4 configured as described above, in each column of pixel array 40, it is possible to read out, in a mixed state of pixel signals, pixel signals from pixels 30 included in first pixel group 100A and pixel signals from pixels 30 included in second pixel group 100B, and it is possible to read out, in a mixed state of pixel signals, pixel signals from pixels 30 included in third pixel group 100C and signals from pixels 30 included in fourth pixel group 100D.

Embodiment 2

Hereinafter, an image sensor according to Embodiment 2 configured by changing a part of the configuration of image sensor 1 according to Embodiment 1 is described.

Hereinafter, constituent elements in the image sensor according to Embodiment 2 that are similar to those of image sensor 1 according to Embodiment 1 are assigned the same reference symbols as those already described, and detailed descriptions thereof will be omitted, with the descriptions focusing on the differences from image sensor 1.

The image sensor according to Embodiment 2 is configured by changing pixel array 40 and readout circuit 60 in image sensor 1 according to Embodiment 1 to a pixel array and a readout circuit according to Embodiment 2, respectively.

Figure 18:
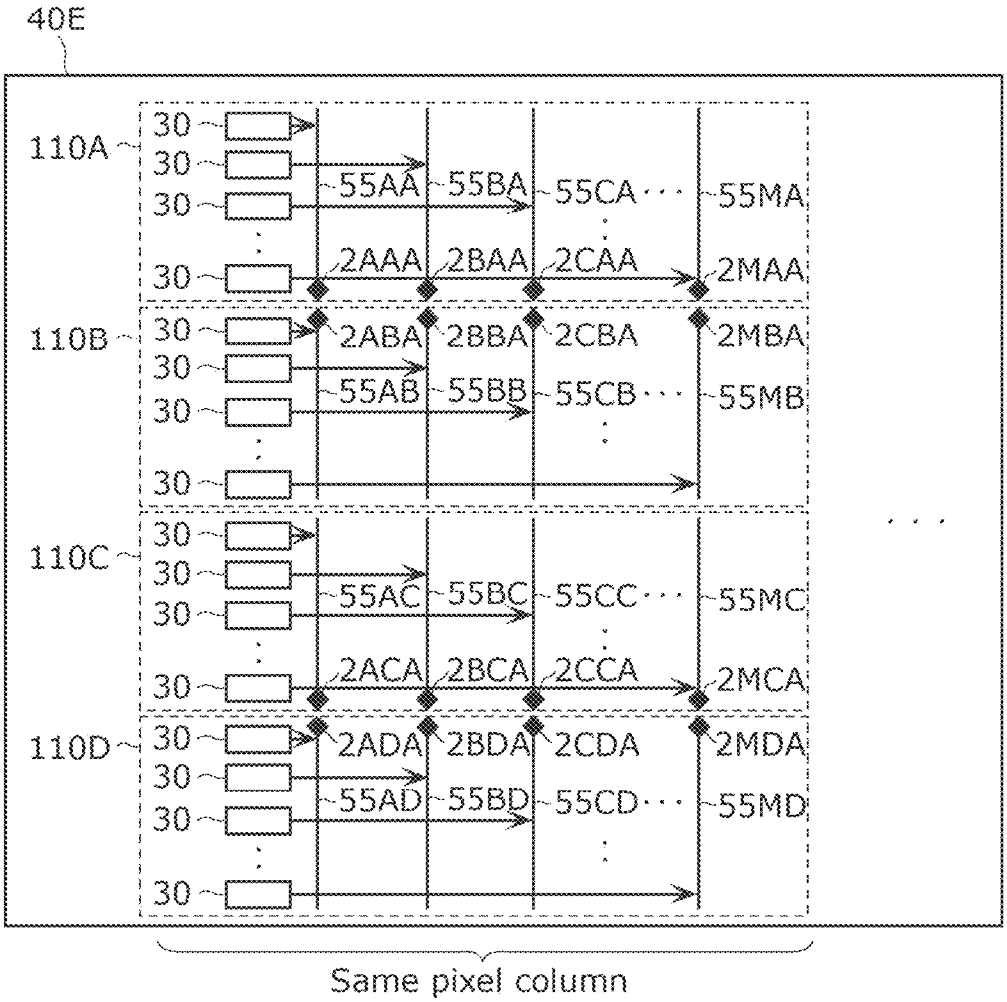
FIG. 18 is a plan view of a pixel array according to Embodiment 2.

FIG. 18 is a plan view of pixel array 40E according to Embodiment 2.

As illustrated in FIG. 18, in pixel array 40E, pixels 30 are arranged in a matrix.

As illustrated in FIG. 18, pixel array 40E includes, for each column, N pixel groups 110 (corresponding to first pixel group 110A, second pixel group 110B, third pixel group 110C, and fourth pixel group 110D in FIG. 18), each of which includes K or more pixels 30 arranged consecutively in a column direction, N being an integer of three or more, K being an integer of four or more. Here, as an example, as illustrated in FIG. 18, the case where N is four, that is, N pixel groups 110 are the four groups: first pixel group 110A, second pixel group 110B, third pixel group 110C, and fourth pixel group 110D, is described. However, as long as N is an integer of three or more, N need not necessarily be limited to four. Furthermore, in the explanation here, each of pixel groups 110 includes K pixels 30. However, not all of pixel groups 110 need necessarily be limited to the configuration of including K pixels 30. For instance, first pixel group 110A may include K pixels 30, second pixel group 110B may include K+1 pixels 30, third pixel group 110C may include K pixels 30, and fourth pixel group 110D may include K+2 pixels 30.

As illustrated in FIG. 18, each of N pixel groups 110 includes M vertical signal lines, M being an integer of at least two and at most K/2. Here, the M vertical lines include first vertical signal line 55A (corresponding to first vertical signal line 55AA, first vertical signal line 55AB, first vertical signal line 55AC, first vertical signal line 55AD in FIG. 18) connected to L or more pixels 30 among K pixels 30 and second vertical signal line 55B (corresponding to second vertical signal line 55BA, second vertical signal line 55BB, second vertical signal line 55BC, second vertical signal line 55BD in FIG. 18) connected to L or more other pixels 30 among K pixels 30, L being an integer of at least two and at most K/2.

In the explanation here, each of N pixel groups 110 includes the M vertical signal lines including first vertical signal line 55A, second vertical signal line 55B, third vertical signal line 55C, and Mth vertical signal line 55M. The M vertical signal lines included in each of N pixel groups 110 may include at least the two vertical signal lines, first vertical signal line 55A and second vertical signal line 55B.

Furthermore, in the explanation here, each of first vertical signal line 55A, second vertical signal line 55B, third vertical signal line 55C, and Mth vertical signal line 55M is connected to L pixels 30. However, as long as each of first vertical signal line 55A, second vertical signal line 55B, third vertical signal line 55C, and Mth vertical signal line 55M is connected to L or more pixels 30, the configuration need not necessarily be limited to the configuration where each of first vertical signal line 55A, second vertical signal line 55B, third vertical signal line 55C, and Mth vertical signal line 55M is connected to L pixels 30. For instance, first vertical signal line 55A may be connected to L pixels 30, second vertical signal line 55B may be connected to L+1 pixels 30, third vertical signal line 55C may be connected to L pixels 30, and Mth vertical signal line 55M may be connected to L+2 pixels 30.

In each column of pixel array 40E, first vertical signal line 55AA includes node 2AAA connected to a node of second semiconductor chip 12 (here, node 2AAB, which is described later). Here, by way of example, but not of limitation, first vertical signal line 55AA includes node 2AAA in an end portion closer to first vertical signal line 55AB.

In each column of pixel array 40E, first vertical signal line 55AB includes node 2ABA connected to a node of second semiconductor chip 12 (here, node 2ABB, which is described later). Here, by way of example, but not of limitation, first vertical signal line 55AB includes node 2ABA in an end portion closer to first vertical signal line 55AA.

In each column of pixel array 40E, first vertical signal line 55AC includes node 2ACA connected to a node of second semiconductor chip 12 (here, node 2ACB, which is described later). Here, by way of example, but not of limitation, first vertical signal line 55AC includes node 2ACA in an end portion closer to first vertical signal line 55AD.

In each column of pixel array 40E, first vertical signal line 55AD includes node 2ADA connected to a node of second semiconductor chip 12 (here, node 2ADB, which is described later). Here, by way of example, but not of limitation, first vertical signal line 55AD includes node 2ADA in an end portion closer to first vertical signal line 55AC.

In each column of pixel array 40E, second vertical signal line 55BA includes node 2BAA connected to a node of second semiconductor chip 12 (here, node 2BAB, which is described later). Here, by way of example, but not of limitation, second vertical signal line 55BA includes node 2BAA in an end portion closer to second vertical signal line 55BB.

In each column of pixel array 40E, second vertical signal line 55BB includes node 2BBA connected to a node of second semiconductor chip 12 (here, node 2BBB, which is described later). Here, by way of example, but not of limitation, second vertical signal line 55BB includes node 2BBA in an end portion closer to second vertical signal line 55BA.

In each column of pixel array 40E, second vertical signal line 55BC includes node 2BCA connected to a node of second semiconductor chip 12 (here, node 2BCB, which is described later). Here, by way of example, but not of limitation, second vertical signal line 55BC includes node 2BCA in an end portion closer to second vertical signal line 55BD.

In each column of pixel array 40E, second vertical signal line 55BD includes node 2BDA connected to a node of second semiconductor chip 12 (here, node 2BDB, which is described later). Here, by way of example, but not of limitation, second vertical signal line 55BD includes node 2BDA in an end portion closer to second vertical signal line 55BC.

In each column of pixel array 40E, third vertical signal line 55CA includes node 2CAA connected to a node of second semiconductor chip 12 (here, node 2CAB, which is described later). Here, by way of example, but not of limitation, third vertical signal line 55CA includes node 2CAA in an end portion closer to third vertical signal line 55CB.

In each column of pixel array 40E, third vertical signal line 55CB includes node 2CBA connected to a node of second semiconductor chip 12 (here, node 2CBB, which is described later). Here, by way of example, but not of limitation, third vertical signal line 55CB includes node 2CBA in an end portion closer to third vertical signal line 55CA.

In each column of pixel array 40E, third vertical signal line 55CC includes node 2CCA connected to a node of second semiconductor chip 12 (here, node 2CCB, which is described later). Here, by way of example, but not of limitation, third vertical signal line 55CC includes node 2CCA in an end portion closer to third vertical signal line 55CD.

In each column of pixel array 40E, third vertical signal line 55CD includes node 2CDA connected to a node of second semiconductor chip 12 (here, node 2CDB, which is described later). Here, by way of example, but not of limitation, third vertical signal line 55CD includes node 2CDA in an end portion closer to third vertical signal line 55CC.

In each column of pixel array 40E, Mth vertical signal line 55MA includes node 2MAA connected to a node of second semiconductor chip 12 (here, node 2MAB, which is described later). Here, by way of example, but not of limitation, Mth vertical signal line 55MA includes node 2MAA in an end portion closer to Mth vertical signal line 55MB.

In each column of pixel array 40E, Mth vertical signal line 55MB includes node 2MBA connected to a node of second semiconductor chip 12 (here, node 2MBB, which is described later). Here, by way of example, but not of limitation, Mth vertical signal line 55MB includes node 2MBA in an end portion closer to Mth vertical signal line 55MA.

In each column of pixel array 40E, Mth vertical signal line 55MC includes node 2MCA connected to a node of second semiconductor chip 12 (here, node 2MCB, which is described later). Here, by way of example, but not of limitation, Mth vertical signal line 55MC includes node 2MCA in an end portion closer to Mth vertical signal line 55MD.

In each column of pixel array 40E, Mth vertical signal line 55MD includes node 2MDA connected to a node of second semiconductor chip 12 (here, node 2MDB, which is described later). Here, by way of example, but not of limitation, Mth vertical signal line 55MD includes node 2MDA in an end portion closer to Mth vertical signal line 55MC.

Figure 19:
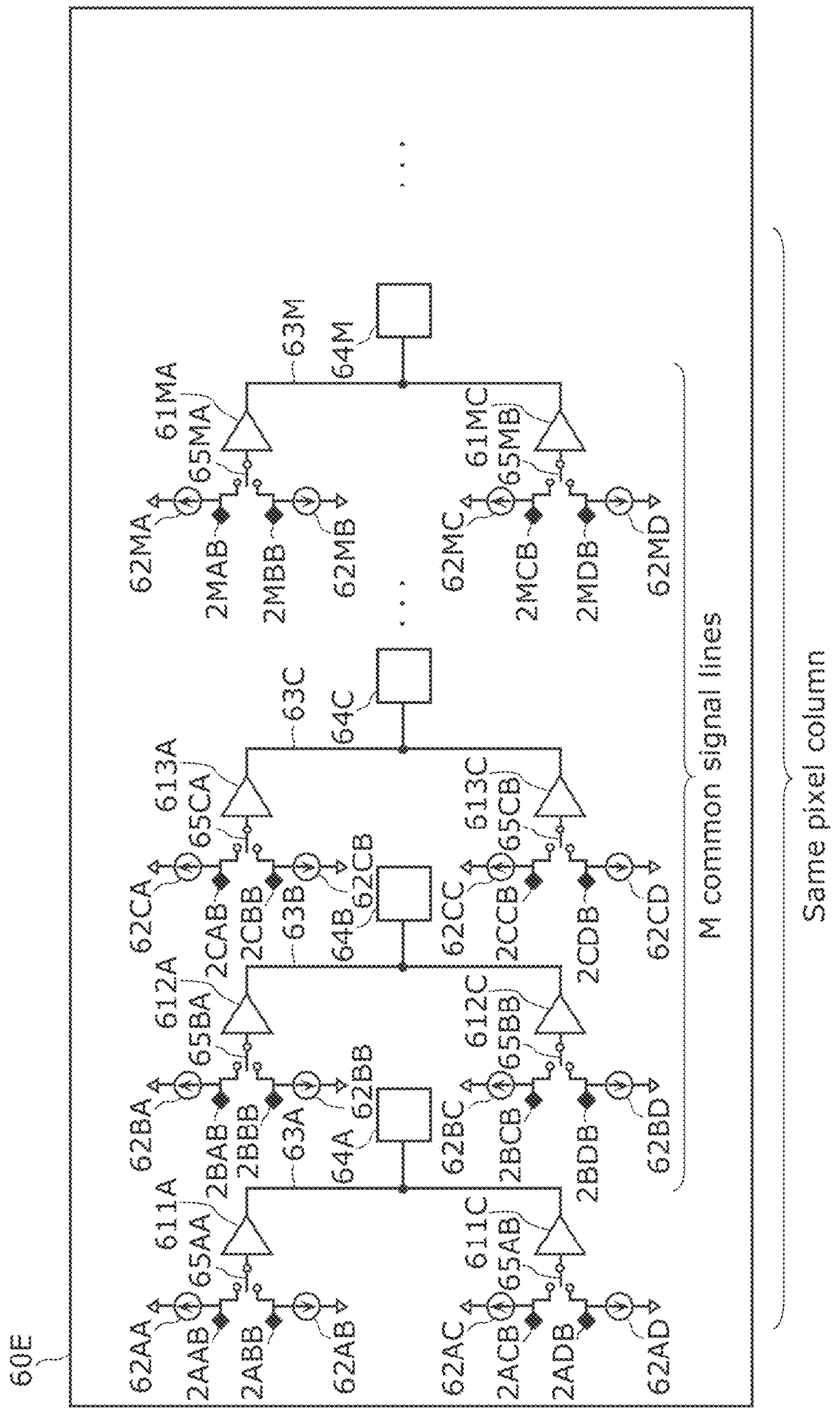
FIG. 19 is a plan view of a readout circuit according to Embodiment 2.

FIG. 19 is a plan view of readout circuit 60E according to Embodiment 2.

As illustrated in FIG. 19, for each column of pixel array 40E, readout circuit 60E includes N/2 (here, two) first impedance converter circuits 611 (corresponding to first impedance converter circuit 611A and first impedance converter circuit 611C in FIG. 19), N/2 second impedance converter circuits 612 (corresponding to second impedance converter circuit 612A and second impedance converter circuit 612C in FIG. 19), N/2 third impedance converter circuits 613 (corresponding to third impedance converter circuit 613A and third impedance converter circuit 613C in FIG. 19), N/2 Mth impedance converter circuits 61M (corresponding to Mth impedance converter circuit 61MA and Mth impedance converter circuit 61MC in FIG. 19), M x N current sources 62 (corresponding to current source 62AA, current source 62AB, current source 62AC, current source 62AD, current source 62BA, current source 62BB, current source 62BC, current source 62BD, current source 62CA, current source 62CB, current source 62CC, current source 62CD, current source 62MA, current source 62MB, current source 62MC, current source 62MD in FIG. 19), M×N/2 switches 65 (corresponding to switch 65AA, switch 65AB, switch 65BA, switch 65BB, switch 65CA, switch 65CB, switch 65MA, switch 65MB in FIG. 19), M common signal lines 63 (referred to as M common signal lines in FIG. 19) (corresponding to common signal line 63A, common signal line 63B, common signal line 63C, common signal line 63M in FIG. 19), first AD converter 64A, second AD converter 64B, third AD converter 64C, and Mth AD converter 64M.

In the explanation here, for each column of pixel array 40E, readout circuit 60E includes a plurality of (here, two) first impedance converter circuits 611, a plurality of (here, two) second impedance converter circuits 612, a plurality of (here, two) third impedance converter circuits 613, and a plurality of (here, two) Mth impedance converter circuits 61M. However, for each column of pixel array 40E, readout circuit 60E may include at least a plurality of first impedance converter circuits 611 and a plurality of second impedance converter circuits 612.

Furthermore, in the explanation here, for each column of pixel array 40E, readout circuit 60E includes M AD converters including first AD converter 64A, second AD converter 64B, third AD converter 64C, and Mth AD converter 64M. However, for each column of pixel array 40E, readout circuit 60E may include at least first AD converter 64A and second AD converter 64B.

Furthermore, for each column of pixel array 40E, readout circuit 60E includes node 2AAB, node 2ABB, node 2ACB, node 2ADB, node 2BAB, node 2BBB, node 2BCB, node 2BDB, node 2CAB, node 2CBB, node 2CCB, node 2CDB, node 2MAB, node 2MBB, node 2MCB, and node 2MDB.

Switch 65AA selectively switches between node 2AAB and node 2ABB, and connects the input of first impedance converter circuit 611A to either node 2AAB or node 2ABB.

Switch 65AB selectively switches between node 2ACB and node 2ADB, and connects the input of first impedance converter circuit 611C to either node 2ACB or node 2ADB.

Switch 65BA selectively switches between node 2BAB and node 2BBB, and connects the input of second impedance converter circuit 612A to either node 2BAB or node 2BBB.

Switch 65BB selectively switches between node 2BCB and node 2BDB, and connects the input of second impedance converter circuit 612C to either node 2BCB or node 2BDB.

Switch 65CA selectively switches between node 2CAB and node 2CBB, and connects the input of third impedance converter circuit 613A to either node 2CAB or node 2CBB.

Switch 65CB selectively switches between node 2CCB and node 2CDB, and connects the input of third impedance converter circuit 613C to either node 2CCB or node 2CDB.

Switch 65MA selectively switches between node 2MAB and node 2MBB, and connects the input of Mth impedance converter circuit 61MA to either node 2MAB or node 2MBB.

Switch 65MB selectively switches between node 2MCB and node 2MDB, and connects the input of Mth impedance converter circuit 61MC to either node 2MCB or node 2MDB.

First impedance converter circuit 611, second impedance converter circuit 612, third impedance converter circuit 613, and Mth impedance converter circuit 61M are similar to first impedance converter circuits 61 according to Embodiment 1.

As illustrated in FIGS. 18 and 19, the input of first impedance converter circuit 611A is connected to first vertical signal line 55AA in a corresponding column of pixel array 40E via switch 65AA, node 2AAB, and node 2AAA or connected to first vertical signal line 55AB in the corresponding column of pixel array 40E via switch 65AA, node 2ABB, and node 2ABA. The input of first impedance converter circuit 611C is connected to first vertical signal line 55AC in a corresponding column of pixel array 40E via switch 65AB, node 2ACB, and node 2ACA or connected to first vertical signal line 55AD in the corresponding column of pixel array 40E via switch 65AB, node 2ADB, and node 2ADA. The input of second impedance converter circuit 612A is connected to second vertical signal line 55BA in a corresponding column of pixel array 40E via switch 65BA, node 2BAB, and node 2BAA or connected to second vertical signal line 55BB in the corresponding column of pixel array 40E via switch 65BA, node 2BBB, and node 2BBA. The input of second impedance converter circuit 612C is connected to second vertical signal line 55BC in a corresponding column of pixel array 40E via switch 65BB, node 2BCB, and node 2BCA or connected to second vertical signal line 55BD in the corresponding column of pixel array 40E via switch 65BB, node 2BDB, and node 2BDA. The input of third impedance converter circuit 613A is connected to third vertical signal line 55CA in a corresponding column of pixel array 40E via switch 65CA, node 2CAB, and node 2CAA or connected to third vertical signal line 55CB in the corresponding column of pixel array 40E via switch 65CA, node 2CBB, and node 2CBA. The input of third impedance converter circuit 613C is connected to third vertical signal line 55CC in a corresponding column of pixel array 40E via switch 65CB, node 2CCB, and node 2CCA or connected to third vertical signal line 55CD in the corresponding column of pixel array 40E via switch 65CB, node 2CDB, and node 2CDA. The input of Mth impedance converter circuit 61MA is connected to Mth vertical signal line 55MA in a corresponding column of pixel array 40E via switch 65MA, node 2MAB, and node 2MAA or connected to Mth vertical signal line 55MB in the corresponding column of pixel array 40E via switch 65MA, node 2MBB, and node 2MBA. The input of Mth impedance converter circuit 61MC is connected to Mth vertical signal line 55MC in a corresponding column of pixel array 40E via switch 65MB, node 2MCB, and node 2MCA or connected to Mth vertical signal line 55MD in the corresponding column of pixel array 40E via switch 65MB, node 2MDB, and node 2MDA.

The outputs of N/2 first impedance converter circuits 611 are connected to first AD converter 64A via common signal line 63A. The outputs of N/2 second impedance converter circuits 612 are connected to second AD converter 64B via common signal line 63B. The outputs of N/2 third impedance converter circuit 613 are connected to third AD converter 64C via common signal line 63C. The outputs of N/2 Mth impedance converter circuits 61M are connected to Mth AD converter 64M via common signal line 63M.

First AD converter 64A converts from analog to digital first impedance conversion signals output from N/2 first impedance converter circuits 611.

Second AD converter 64B converts from analog to digital second impedance conversion signals output from N/2 second impedance converter circuits 612.

Third AD converter 64C converts from analog to digital third impedance conversion signals output from N/2 third impedance converter circuits 613.

Mth AD converter 64M converts from analog to digital Mth impedance conversion signals output from N/2 Mth impedance converter circuits 61M.

Current source 62AA is connected to first vertical signal line 55AA in a corresponding column of pixel array 40E via node 2AAB and node 2AAA. Current source 62AB is connected to first vertical signal line 55AB in a corresponding column of pixel array 40E via node 2ABB and node 2ABA. Current source 62AC is connected to first vertical signal line 55AC in a corresponding column of pixel array 40E via node 2ACB and node 2ACA. Current source 62AD is connected to first vertical signal line 55AD in a corresponding column of pixel array 40E via node 2ADB and node 2ADA. Current source 62BA is connected to second vertical signal line 55BA in a corresponding column of pixel array 40E via node 2BAB and node 2BAA. Current source 62BB is connected to second vertical signal line 55BB in a corresponding column of pixel array 40E via node 2BBB and node 2BBA. Current source 62BC is connected to second vertical signal line 55BC in a corresponding column of pixel array 40E via node 2BCB and node 2BCA. Current source 62BD is connected to second vertical signal line 55BD in a corresponding column of pixel array 40E via node 2BDB and node 2BDA. Current source 62CA is connected to third vertical signal line 55CA in a corresponding column of pixel array 40E via node 2CAB and node 2CAA. Current source 62CB is connected to third vertical signal line 55CB in a corresponding column of pixel array 40E via node 2CBB and node 2CBA. Current source 62CC is connected to third vertical signal line 55CC in a corresponding column of pixel array 40E via node 2CCB and node 2CCA. Current source 62CD is connected to third vertical signal line 55CD in a corresponding column of pixel array 40E via node 2CDB and node 2CDA. Current source 62MA is connected to Mth vertical signal line 55MA in a corresponding column of pixel array 40E via node 2MAB and node 2MAA. Current source 62MB is connected to Mth vertical signal line 55MB in a corresponding column of pixel array 40E via node 2MBB and node 2MBA. Current source 62MC is connected to Mth vertical signal line 55MC in a corresponding column of pixel array 40E via node 2MCB and node 2MCA. Current source 62MD is connected to Mth vertical signal line 55MD in a corresponding column of pixel array 40E via node 2MDB and node 2MDA.

<Observations>

In the imaging device according to Embodiment 2 configured as described above, in each column of pixel array 40E, it is possible to read out pixel signals in parallel from pixel 30 connected to first vertical signal line 55A and pixel 30 connected to second vertical signal line 55B, which are included in the same pixel group, that is, are relatively close to each other. Thus, when pixel signals are read out from pixels 30 by sequentially performing readout scanning for each row of pixel array 40E, it is possible to decrease, to a relatively small shift (rolling shutter distortion), the shift of a subject in a captured image that can be caused by reading out pixel signals in parallel from two pixels relatively distant from each other in each column of pixel array 40E when capturing an image of the moving subject. Thus, it is possible to make the aliasing less noticeable.

It should be noted that in Embodiment 2, in one pixel group 110 (for example, first pixel group 110A) among N pixel groups 110, at least one of pixels 30 connected to the M vertical signal lines may be optical black (OB) pixel 30E.

Here, OB pixel 30E is pixel 30 in which photoelectric conversion unit 31 does not receive light.

Figure 20:
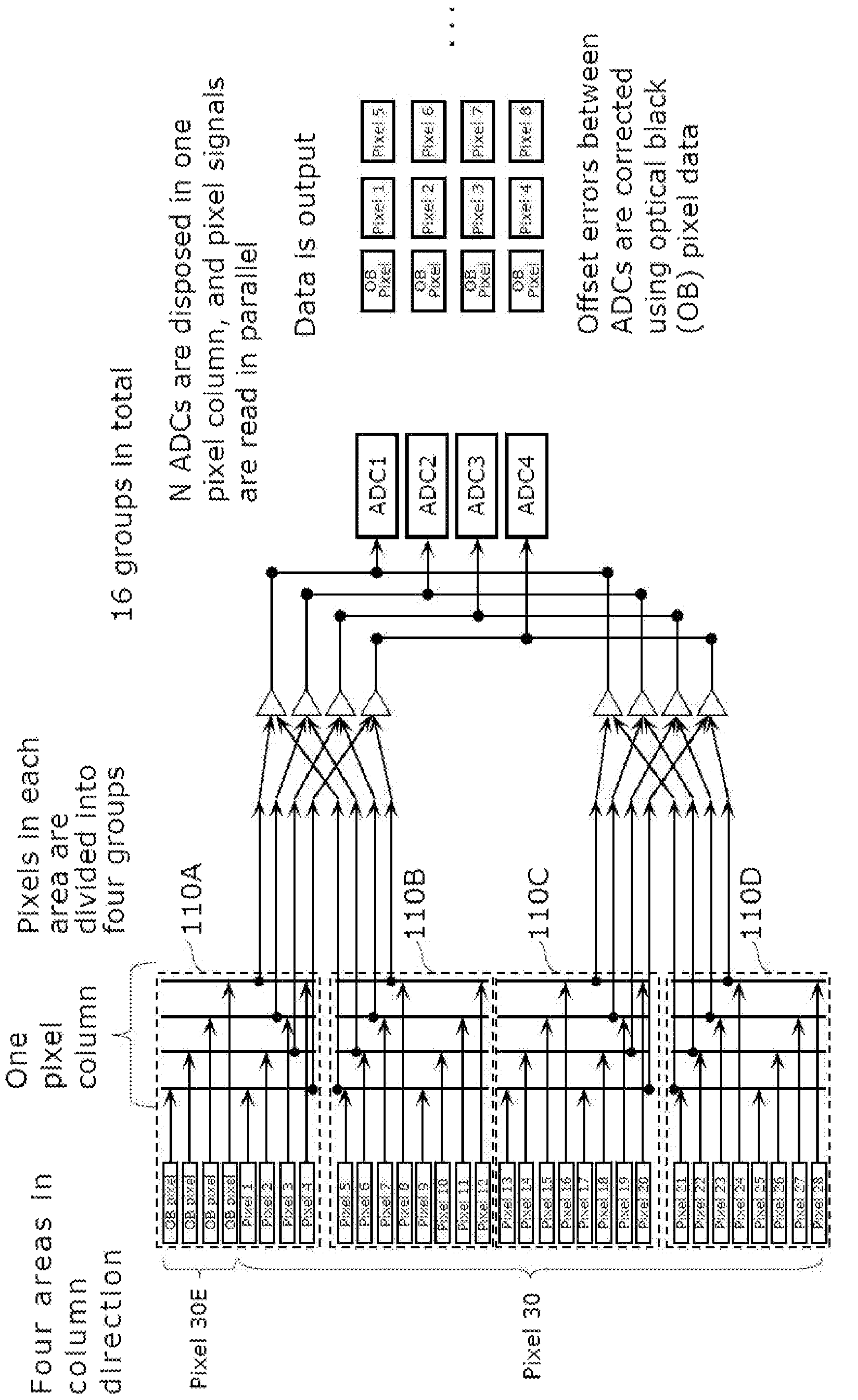
FIG. 20 is a configuration diagram illustrating a configuration example of the readout circuit according to Embodiment 2.

FIG. 20 is a schematic diagram illustrating a configuration example of readout circuit 60E when N is four, M is four, K is eight, and L is two.

As illustrated in FIG. 20, in the configuration example, four pixels 30 among pixels 30 included in first pixel group 110A are OB pixels 30E. Then, in first pixel group 110A, four OB pixels 30E are connected one-to-one to the four vertical signal lines.

In the above configuration example, each of the four AD converters (corresponding to ADC1, ADC2, ADC3, ADC4 in FIG. 20 and first AD converter 64A, second AD converter 64B, third AD converter 64C, and Mth AD converter 64M in FIG. 19) converts from analog to digital the pixel signal of OB pixel 30E.

Thus, in the configuration example, offset errors between the four AD converters can be corrected using the pixel signals of four OB pixels 30E.

Variation 5

Hereinafter, an image sensor according to Variation 5 configured by changing a part of the configuration of the image sensor according to Embodiment 2 is described.

Hereinafter, constituent elements in the image sensor according to Variation 5 that are similar to those of the image sensor according to Embodiment 2 are assigned the same reference symbols as those already described, and detailed descriptions thereof will be omitted, with the descriptions focusing on the differences from the image sensor according to Embodiment 2.

The image sensor according to Variation 5 is configured by changing pixel array 40E and readout circuit 60E in the image sensor according to Embodiment 2 to a pixel array and a readout circuit according to Variation 5, respectively.

Figure 21:
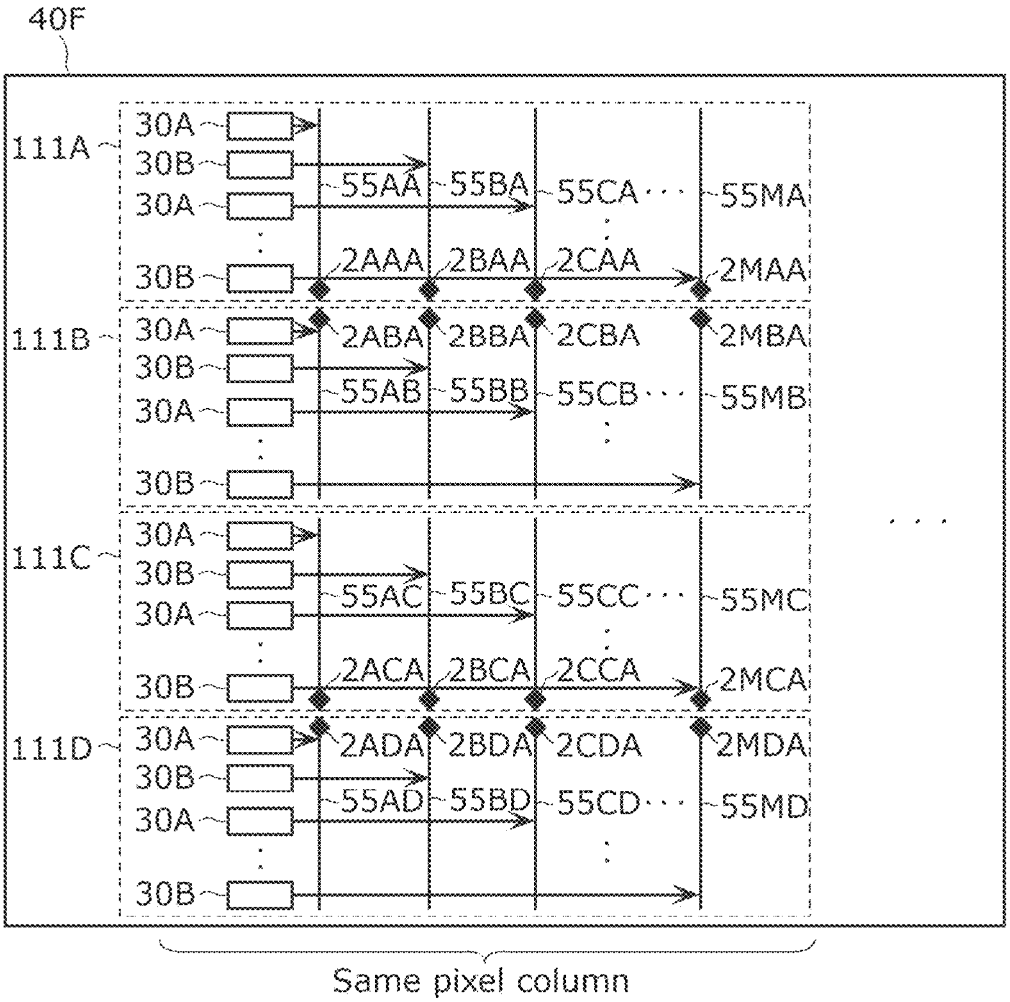
FIG. 21 is a plan view of a pixel array according to Variation 5.

FIG. 21 is a plan view of pixel array 40F according to Variation 5.

As illustrated in FIG. 21, pixel array 40F is configured by changing N pixel groups 110 in each column in pixel array 40E according to Embodiment 2 to N pixel groups 111 (corresponding to first pixel group 111A, second pixel group 111B, third pixel group 111C, fourth pixel group 111D in FIG. 21).

Each of N pixel groups 111 is configured by, in each of N pixel groups 110, changing pixel 30 connected to first vertical signal line 55A and pixel 30 connected to third vertical signal line 55C to pixels 30A and changing pixel 30 connected to second vertical signal line 55B and pixel 30 connected to Mth vertical signal line 55M to pixels 30B.

Here, in Variation 5, L is an integer of two or more, M is an integer of four or more, and K is an integer of eight or more.

Furthermore, although not illustrated in FIG. 21, L or more pixels 30A are connected to first vertical signal line 55A, L or more pixel 30B are connected to second vertical signal line 55B, L or more pixels 30A are connected to third vertical signal line 55C, and L or more pixels 30B are connected to Mth vertical signal line 55M.

Pixel 30A is configured by changing photoelectric conversion unit 31 of pixel 30 according to Embodiment 1 to a photoelectric conversion unit that receives light of a first color that has transmitted through a first color filter. Pixel 30B is configured by changing photoelectric conversion unit 31 of pixel 30 according to Embodiment 1 to a photoelectric conversion unit that receives light of a second color that has transmitted through a second color filter, the second color being different from the first color.

Figure 22:
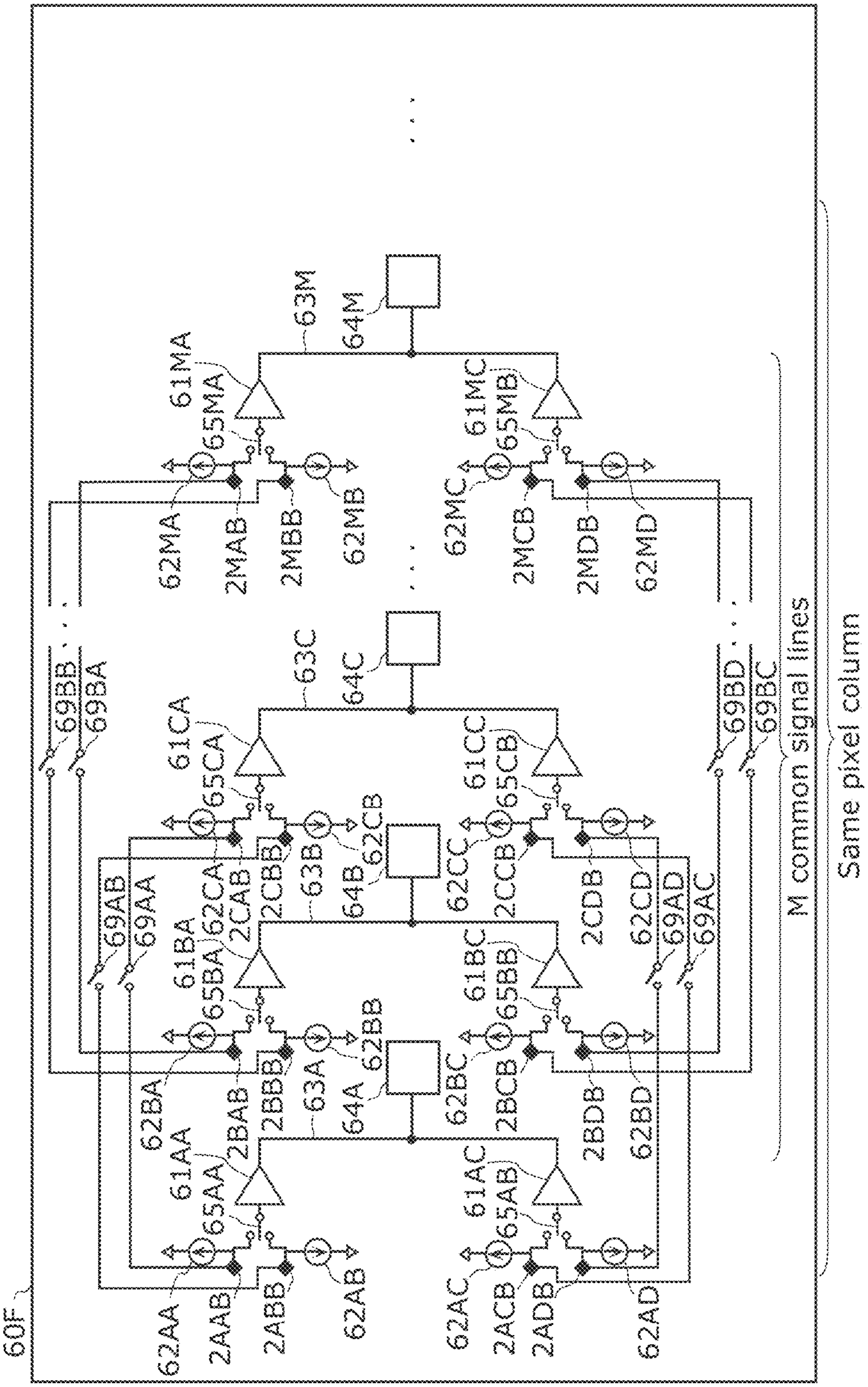
FIG. 22 is a plan view of a readout circuit according to Variation 5.

FIG. 22 is a plan view of readout circuit 60F according to Variation 5.

As illustrated in FIG. 22, readout circuit 60F is configured by adding M×N/2 switches 69 (corresponding to switch 69AA, switch 69AB, switch 69AC, switch 69AD, switch 69BA, switch 69BB, switch 69BC, switch 69BD in FIG. 22) to readout circuit 60E according to Embodiment 2.

Switch 69AA switches between a conductive state in which node 2AAB and node 2CAB are electrically connected and a nonconductive state in which node 2AAB and node 2CAB are not electrically connected. That is, switch 69AA switches between a conductive state in which first vertical signal line 55AA and third vertical signal line 55CA are electrically connected and a nonconductive state in which first vertical signal line 55AA and third vertical signal line 55CA are not electrically connected. Here, first vertical signal line 55AA is included in first pixel group 111A and connected to pixel 30A, and third vertical signal line 55CA is included in first pixel group 111A and connected to pixel 30A.

Switch 69AB switches between a conductive state in which in node 2ABB and node 2CBB are electrically connected and a nonconductive state in which node 2ABB and node 2CBB are not electrically connected. That is, switch 69AB switches between a conductive state in which first vertical signal line 55AB and third vertical signal line 55CB are electrically connected and a nonconductive state in which first vertical signal line 55AB and third vertical signal line 55CB are not electrically connected. Here, first vertical signal line 55AB is included in second pixel group 111B and connected to pixel 30A, and third vertical signal line 55CB is included in second pixel group 111B and connected to pixel 30A.

Switch 69AC switches between a conductive state in which node 2ACB and node 2CCB are electrically connected and a nonconductive state in which node 2ACB and node 2CCB are not electrically connected. That is, switch 69AC switches between a conductive state in which first vertical signal line 55AC and third vertical signal line 55CC are electrically connected and a nonconductive state in which first vertical signal line 55AC and third vertical signal line 55CC are not electrically connected. Here, first vertical signal line 55AC is included in third pixel group 111C and connected to pixel 30A, and third vertical signal line 55CC is included in third pixel group 111C and connected to pixel 30A.

Switch 69AD switches between a conductive state in which node 2ADB and node 2CDB are electrically connected and a nonconductive state in which node 2ADB and node 2CDB are not electrically connected. That is, switch 69AD switches between a conductive state in which first vertical signal line 55AD and third vertical signal line 55CD are electrically connected and a nonconductive state in which first vertical signal line 55AD and third vertical signal line 55CD are not electrically connected. Here, first vertical signal line 55AD is included in fourth pixel group 111D and connected to pixel 30A, and third vertical signal line 55CD is included in fourth pixel group 111D and connected to pixel 30A.

Switch 69BA switches between a conductive state in which node 2BAB and node 2MAB are electrically connected and a nonconductive state in which node 2BAB and node 2MAB are not electrically connected. That is, switch 69BA switches between a conductive state in which second vertical signal line 55BA and Mth vertical signal line 55MA are electrically connected and a nonconductive state in which second vertical signal line 55BA and Mth vertical signal line 55MA are not electrically connected. Here, second vertical signal line 55BA is included in first pixel group 111A and connected to pixel 30B, and Mth vertical signal line 55MA is included in first pixel group 111A and connected to pixel 30B.

Switch 69BB switches between a conductive state in which node 2BBB and node 2MBB are electrically connected and a nonconductive state in which node 2BBB and node 2MBB are not electrically connected. That is, switch 69BB switches between a conductive state in which second vertical signal line 55BB and Mth vertical signal line 55MB are electrically connected and a nonconductive state in which second vertical signal line 55BB and Mth vertical signal line 55MB are not electrically connected. Here, second vertical signal line 55BB is included in second pixel group 111B and connected to pixel 30B, and Mth vertical signal line 55MB is included in second pixel group 111B and connected to pixel 30B.

Switch 69BC switches between a conductive state in which node 2BCB and node 2MCB are electrically connected and a nonconductive state in which node 2BCB and node 2MCB are not electrically connected. That is, switch 69BC switches between a conductive state in which second vertical signal line 55BC and Mth vertical signal line 55MC are electrically connected and a nonconductive state in which second vertical signal line 55BC and Mth vertical signal line 55MC are not electrically connected. Here, second vertical signal line 55BC is included in third pixel group 111C and connected to pixel 30B, and Mth vertical signal line 55MC is included in third pixel group 111C and connected to pixel 30B.

Switch 69BD switches between a conductive state in which node 2BDB and node 2MDB are electrically connected and a nonconductive state in which node 2BDB and node 2MDB are not electrically connected. That is, switch 69BD switches between a conductive state in which third vertical signal line 55CD and Mth vertical signal line 55MD are electrically connected and a nonconductive state in which third vertical signal line 55CD and Mth vertical signal line 55MD are not electrically connected. Here, third vertical signal line 55CD is included in fourth pixel group 111D and connected to pixel 30B, and Mth vertical signal line 55MD is included in fourth pixel group 111D and connected to pixel 30B.

<Observations>

In the imaging device according to Variation 5 configured as described above, in each pixel group 111 in each column of pixel array 40F, it is possible to read out, in a mixed state of pixel signals, pixel signals from pixel 30A that is connected to first vertical signal line 55A and receives the light of the first color and pixel 30A that is connected to third vertical signal line 55C and receives the light of the first color, and it is possible to read out, in a mixed state of pixel signals, pixel signals from pixel 30B that is connected to second vertical signal line 55B and receives the light of the second color and pixel 30B that is connected to Mth vertical signal line 55M and receives the light of the second color.

Embodiment 3

Hereinafter, an imaging device according to Embodiment 3 including the image sensor according to any one of Embodiments 1 and 2 and Variations 1 to 5 is described.

Hereinafter, the imaging device according to Embodiment 3 is described as including image sensor 1 according to Embodiment 1. However, as long as the imaging device according to Embodiment 3 includes the image sensor according to any one of Embodiments 1 and 2 and Variations 1 to 5, the configuration need not necessarily be limited to the configuration of including image sensor 1 according to Embodiment 1.

Figure 23:
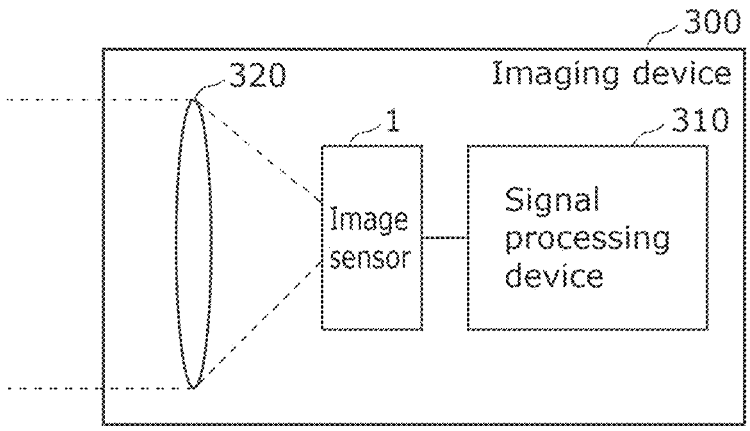
FIG. 23 is a schematic diagram illustrating a configuration of an imaging device according to Embodiment 3.

FIG. 23 is a schematic diagram illustrating a configuration of imaging device 300 according to Embodiment 3.

Examples of imaging device 300 include a digital still camera and a handy video recorder.

As illustrated in FIG. 23, imaging device 300 includes image sensor 1, signal processing device 310, and lens 320.

Lens 320 focuses light from a subject to be imaged by imaging device 300 onto an area where pixel array 40 in image sensor 1 is formed, and forms an image of the subject on the area where pixel array 40 in image sensor 1 is formed.

Signal processing device 310 performs various signal processes on a signal (e.g., an image) output from image sensor 1.

<Observations>

As described in Embodiment 1, in image sensor 1, it is possible to increase the readout rate at which to read out a pixel signal from pixel 30, while suppressing the quality degradation of an image to be captured.

Accordingly, in imaging device 300 configured as described above, it is possible to increase the readout rate at which to read out a pixel signal from pixel 30, while suppressing the quality degradation of an image to be captured.

Supplementary Notes

The image sensors and the imaging devices according to aspects of the present disclosure are described above on the basis of Embodiments 1 to 3 and Variations 1 to 5. However, the present disclosure is not limited to the embodiments and variations. One aspect or aspects of the present disclosure may include, within the scope of the present disclosure, embodiment(s) obtained by making various changes envisioned by those skilled in the art to the embodiments and variations and embodiment(s) obtained by combining some of the structural elements described in different embodiments and variations.

(1) In Embodiments 1 to 3 and Variations 1 to 5, N is described as an integer of three or more. However, N may be two. That is, N may be an integer of two or more.

Figure 24:
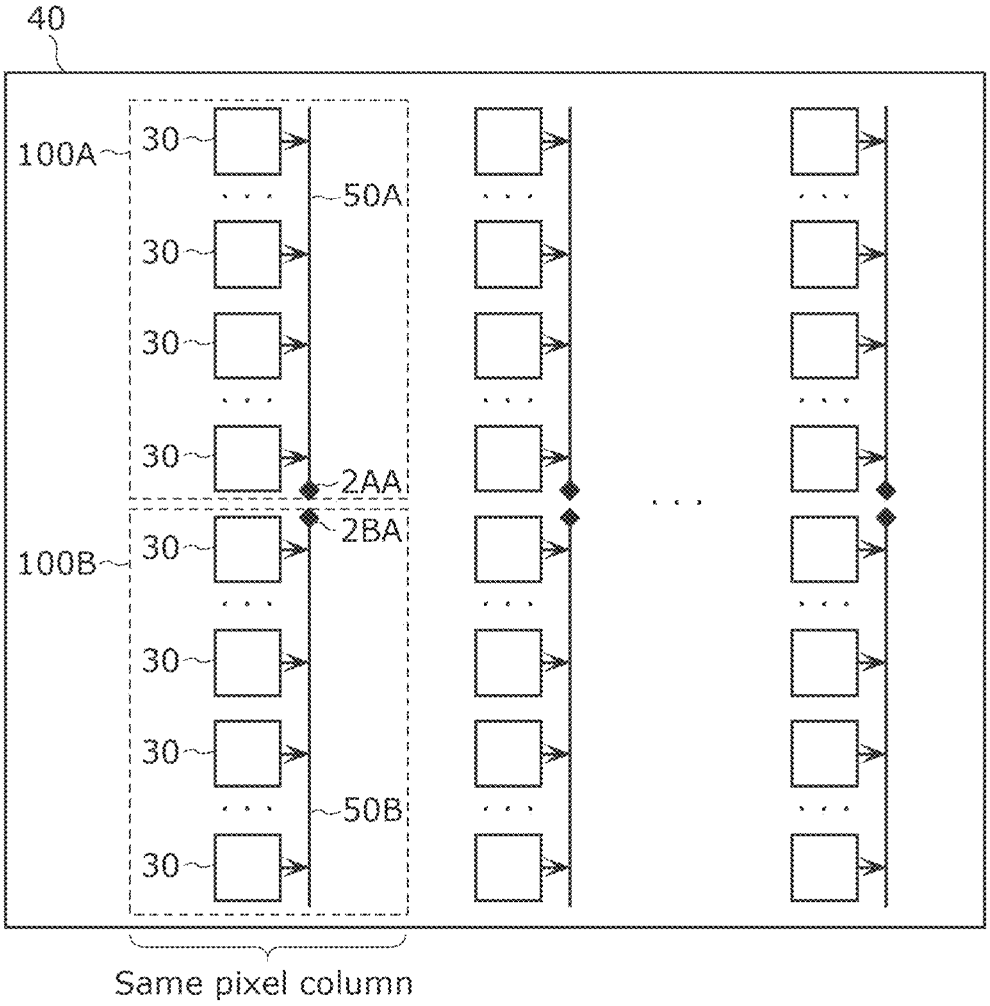
FIG. 24 is a plan view of a pixel array according to a supplementary variation.
Figure 25:
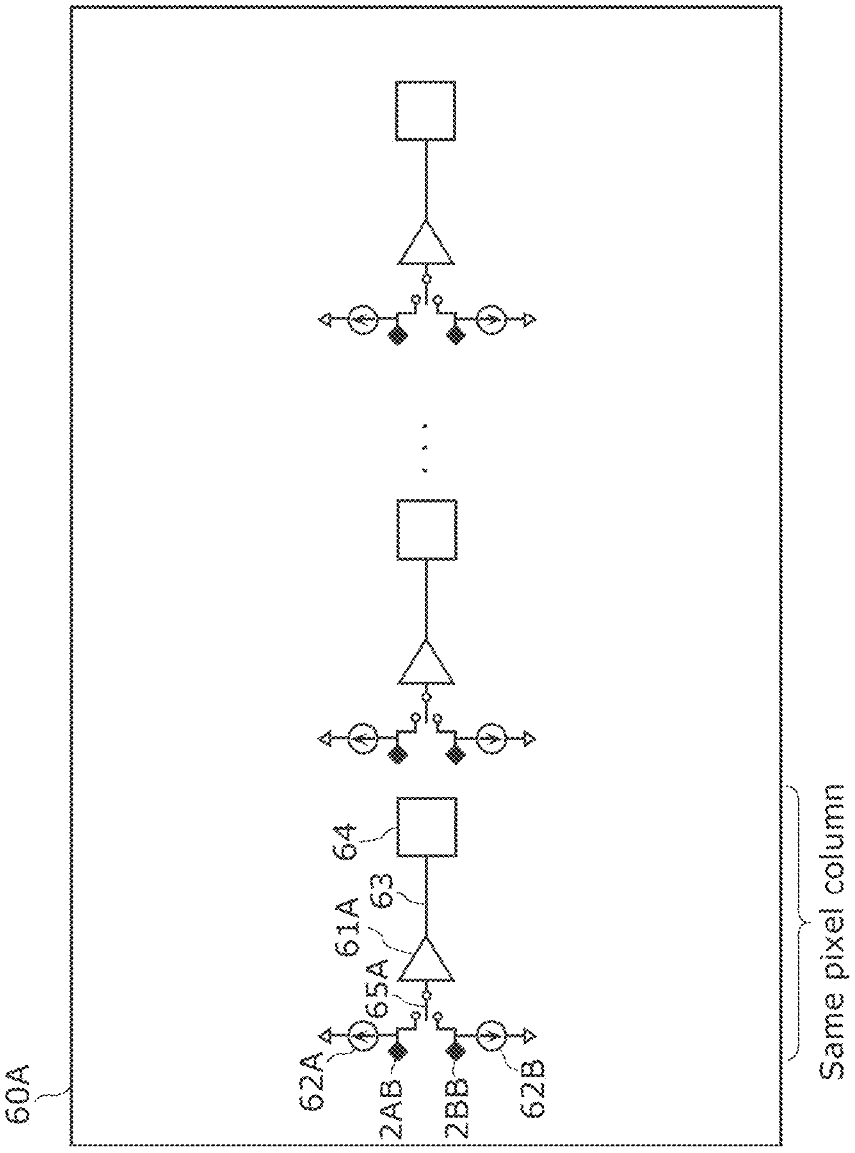
FIG. 25 is a plan view of a readout circuit according to the supplementary variation.

FIG. 24 illustrates an example of a plan view of pixel array 40 when N is two. FIG. 25 illustrates an example of a plan view of readout circuit 60A when N is two.

(2) Embodiment 1 exemplifies the circuit configuration illustrated in FIG. 7 as an example of a circuit configuration of first impedance converter circuit 61 having the function of setting the output to high impedance.

However, first impedance converter circuit 61 need not be limited to the circuit configuration illustrated in FIG. 7.

Figure 26:
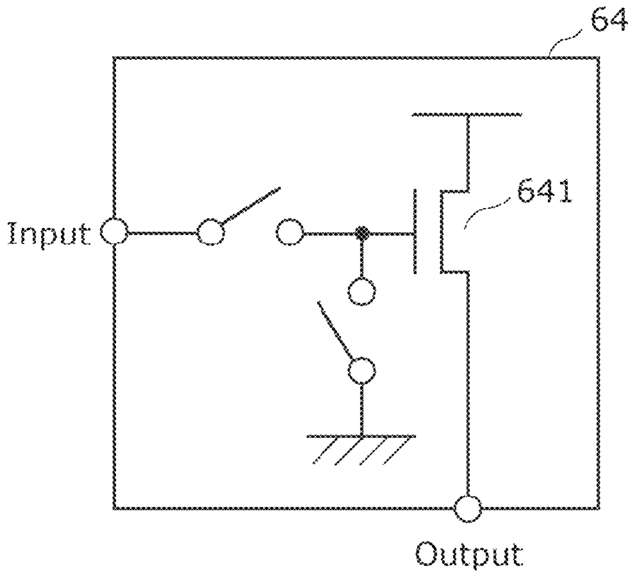
FIG. 26 is a circuit diagram illustrating a configuration example of a first impedance converter circuit according to the supplementary variation.

For instance, the circuit configuration illustrated in FIG. 26 is considered as another circuit configuration of first impedance converter circuit 61 having the function of setting the output to high impedance.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is widely applicable to, for example, image sensors and imaging devices.

The invention claimed is:

1. An image sensor comprising:

a pixel array in which a plurality of pixels are arranged in a matrix, the plurality of pixels each including:

a photoelectric conversion unit that converts received light into a charge;

a charge accumulation section that accumulates the charge converted by the photoelectric conversion unit; and an amplifying transistor that outputs a pixel signal corresponding to an amount of the charge accumulated in the charge accumulation section;

a plurality of first impedance converter circuits for each column of the pixel array, each of which is a first impedance converter circuit in which output impedance is lower than input impedance and that receives a pixel signal from at least one of the plurality of pixels; and a first analog-to-digital (AD) converter for each column of the pixel array, the first AD converter converting from analog to digital a plurality of first impedance conversion signals output from the plurality of first impedance converter circuits, wherein the pixel array includes, for each column, N pixel groups each including K or more pixels included in the plurality of pixels and consecutively arranged in a column direction of the pixel array, N and K each being an integer of two or more, each of the N pixel groups includes a first vertical signal line connected to L or more first pixels among the K or more pixels, L being an integer of at least two and at most K, and in each column of the pixel array, each of the N first vertical signal lines of the N pixel groups is connected to an input of one of the plurality of first impedance converter circuits, and an output of each of the plurality of first impedance converter circuits is connected to the first AD converter.

2. The image sensor according to claim 1, wherein

L is equal to K, and the K or more pixels are the L or more first pixels.

3. The image sensor according to claim 1, wherein

K is an integer of four or more,

L is an integer of at least two and at most K/2, the image sensor further comprises:

a plurality of second impedance converter circuits for each column of the pixel array, each of which is a second impedance converter circuit in which output impedance is lower than input impedance and that receives a pixel signal from at least one of the plurality of pixels; and a second analog-to-digital (AD) converter for each column of the pixel array, the second AD converter converting from analog to digital a plurality of second impedance conversion signals output from the plurality of second impedance converter circuits, each of the N pixel groups further includes a second vertical signal line connected to L or more second pixels included in the K or more pixels and different from the L or more first pixels, and in each column of the pixel array, each of the N second vertical signal lines of the N pixel groups is connected to an input of one of the plurality of second impedance converter circuits, and an output of each of the plurality of second impedance converter circuits is connected to the second AD converter.

4. The image sensor according to claim 1, wherein in each column of the pixel array, an input of each of at least one first impedance converter circuit among the plurality of first impedance converter circuits is connected to one of the two first vertical signal lines of two pixel groups adjacent to each other in the column direction of the pixel array among the N pixel groups.

5. The image sensor according to claim 1, wherein each of the plurality of first impedance converter circuits includes an output transistor that outputs a first impedance conversion signal corresponding to the first impedance converter circuit among the plurality of first impedance conversion signals, and the output transistor has a drive capability higher than a drive capability of the amplifying transistor.

6. The image sensor according to claim 1, further comprising:

a plurality of current sources for each column of the pixel array that pass currents through the N first vertical signal lines; and a reference current source that uniformly specifies currents flowing through at least two current sources among all current sources included in the image sensor.

7. The image sensor according to claim 1, wherein the image sensor is configured by including a first semiconductor chip and a second semiconductor chip stacked on one another, the first semiconductor chip being a semiconductor chip in which the pixel array is formed, the second semiconductor chip being a semiconductor chip in which the plurality of first impedance converter circuits and the first AD converter included for each column of the pixel array are formed, in the plan view of the pixel array, in each column of the pixel array, the N first vertical signal lines of the N pixel groups extend and are aligned in the column direction of the pixel array, and a presence area in the column direction of the pixel array of one or more lines for connecting the output of each of the plurality of first impedance converter circuits and the first AD converter is within a presence area in the column direction of the pixel array of the N first vertical signal lines.

8. The image sensor according to claim 1, wherein the pixel array further includes, for each column, a plurality of current sources that pass currents through the N first vertical signal lines, the image sensor further comprises a controller that controls all current sources included in the pixel array, and in each column of the pixel array, the controller causes a current source, among the plurality of current sources, that passes a current through the first vertical signal line of a readout execution pixel group to enter an active state, and one or more other current sources among the plurality of current sources to enter a non-active state, the readout execution pixel group being a pixel group including the K or more pixels that output pixel signals.

9. The image sensor according to claim 1, wherein the pixel array further includes, for each column, a plurality of current sources that pass currents through the N first vertical signal lines, the image sensor further comprises a controller that controls all current sources included in the pixel array, and in each column of the pixel array, the controller causes a current source, among the plurality of current sources, that passes a current through the first vertical signal line of a readout execution pixel group to enter a first active state, and one or more other current sources among the plurality of current sources to enter a second active state in which a current amount is less than a current amount in the first active state, the readout execution pixel group being a pixel group including the K or more pixels that output pixel signals.

10. The image sensor according to claim 1, wherein the pixel array further includes, for each column, a plurality of current sources that pass currents through the N first vertical signal lines, the image sensor further comprises a controller that controls all current sources included in the pixel array, and in each column of the pixel array, the controller (1) causes a current source, among the plurality of current sources, that passes a current through the first vertical signal line of a readout execution pixel group to enter an active state, the readout execution pixel group being a pixel group including the K or more pixels that output pixel signals, (2) causes a current source, among the plurality of current sources, that passes a current through the first vertical signal line of a readout pre-execution pixel group to enter the active state before the K or more pixels included in the readout pre-execution pixel group start outputting pixel signals, the readout pre-execution pixel group being a pixel group including the K or more pixels that will output the pixel signals following output of the K or more pixels of the readout execution pixel group, and (3) causes one or more current sources except for the current source that passes the current through the first vertical signal line of the readout execution pixel group and the current source that passes the current through the first vertical signal line of the readout pre-execution pixel group, to enter a non-active state.

11. The image sensor according to claim 1, wherein the pixel array further includes, for each column, a plurality of current sources, and one or more current sources among the plurality of current sources pass a current through a power supply line connected to the K or more pixels included in each of the N pixel groups, the image sensor further comprises a controller that controls all current sources included in the pixel array, and in each column of the pixel array, the controller causes a current source, among the plurality of current sources, that passes a current through the power supply line connected to the K or more pixels included in a readout pre-execution pixel group to enter an active state before the K or more pixels included in the readout pre-execution pixel group start outputting pixel signals, the readout pre-execution pixel group being a pixel group including the K or more pixels that will output the pixel signals following output of the K or more pixels included in a readout execution pixel group, the readout execution pixel group being a pixel group including the K or more pixels that output pixel signals, and causes one or more current sources except for the current source that passes the current through the power supply line connected to the K or more pixels included in the readout pre-execution pixel group to enter a non-active state.

12. The image sensor according to claim 1, wherein the pixel array further includes, for each column, a plurality of current sources that pass currents through the N first vertical signal lines, the image sensor further comprises a controller that controls all current sources included in the pixel array, and in each column of the pixel array, the controller (1) causes a current source, among the plurality of current sources, that passes a current through the first vertical signal line of a readout execution pixel group to enter an active state, the readout execution pixel group being a pixel group including the K or more pixels that output pixel signals, (2) causes a current source, among the plurality of current sources, that passes a current through the first vertical signal line of a readout post-execution pixel group to remain in the active state for a certain period of time even after the K or more pixels included in the readout post-execution pixel group finish outputting pixel signals, the readout post-execution pixel group being a pixel group including the K or more pixels that have output the pixel signals preceding output of the K or more pixels of the readout execution pixel group, and (3) causes one or more current sources except for the current source that passes the current through the first vertical signal line of the readout execution pixel group and the current source that passes the current through the first vertical signal line of the readout post-execution pixel group, to enter a non-active state.

13. The image sensor according to claim 1, wherein the pixel array further includes, for each column, a plurality of current sources, and one or more current sources among the plurality of current sources pass a current through a power supply line connected to the K or more pixels included in each of the N pixel groups, the image sensor further comprises a controller that controls all current sources included in the pixel array, and in each column of the pixel array, the controller causes a current source, among the plurality of current sources, that passes a current through the power supply line connected to the K or more pixels included in a readout post-execution pixel group to remain in an active state for a certain period of time even after the K or more pixels included in the readout post-execution pixel group finish outputting pixel signals, the readout post-execution pixel group being a pixel group including the K or more pixels that have output the pixel signals preceding output of the K or more pixels included in a readout execution pixel group, the readout execution pixel group being a pixel group including the K or more pixels that output pixel signals, and causes one or more current sources except for the current source that passes the current through the power supply line connected to the K or more pixels included in the readout post-execution pixel group to enter a non-active state.

14. The image sensor according to claim 1, wherein

N is an even number of four or more, in each column of the pixel array, the N pixel groups include at least a first pixel group, a second pixel group, a third pixel group, and a fourth pixel group, and for each column of the pixel array, the image sensor comprises:

a first switch that switches between a conductive state in which the first vertical signal line included in the first pixel group and the first vertical signal line included in the second pixel group are electrically connected and a nonconductive state in which the first vertical signal line included in the first pixel group and the first vertical signal line included in the second pixel group are not electrically connected; and a second switch that switches between a conductive state in which the first vertical signal line included in the third pixel group and the first vertical signal line included in the fourth pixel group are electrically connected and a nonconductive state in which the first vertical signal line included in the third pixel group and the first vertical signal line included in the fourth pixel group are not electrically connected.

15. An imaging device comprising:

the image sensor according to claim 1; and a signal processor coupled to the image sensor.

16. An image sensor comprising:

a pixel array in which a plurality of pixels are arranged in a matrix, the plurality of pixels each including a photoelectric conversion unit that converts received light into a charge;

pixel groups each including pixels included in the plurality of pixels in the pixel array;

a vertical signal line connected to at least one of the pixels included in one of the pixel groups;

an impedance converter circuit that is connected to the vertical signal line and in which output impedance is lower than input impedance; and an analog-to-digital (AD) converter connected to the impedance converter circuit, wherein the impedance converter circuit includes a plurality of impedance converter circuits, the pixel array includes, for each column, N pixel groups including the plurality of pixels each connected to one of M vertical signal lines, N being an integer of two or more, M being an integer of one or more, the N pixel groups being the pixel groups, the M vertical signal lines each being the vertical signal line, each of N×M vertical signal lines included in the N pixel groups is connected to an input of one of the plurality of impedance converter circuits, the N×M vertical signal lines each being the vertical signal line, and at least one vertical signal line of the M vertical signal lines included in each of P pixel groups among the N pixel groups is connected to a common AD converter via at least one of the plurality of impedance converter circuits, P being an integer of at least two and at most N, the common AD converter being the AD converter.

17. The image sensor according to claim 16, further comprising:

a plurality of switches capable of selecting one vertical signal line from among the M vertical signal lines included in each of two or more pixel groups different from each other among the N pixel groups, wherein each of inputs of the plurality of impedance converter circuits is connected to one of the plurality of switches.

18. The image sensor according to claim 16, wherein one of the M vertical signal lines included in each of the P pixel groups among the N pixel groups is connected to the common AD converter via one of the plurality of impedance converter circuits, P being an integer of at least two and at most N, and the plurality of impedance converter circuits each have a function of setting an output to high impedance.

19. The image sensor according to claim 16, wherein the AD converter includes a plurality of AD converters, and in a plan view, at least one of output lines each connecting one impedance converter circuit among the plurality of impedance converter circuits and one AD converter among the plurality of AD converters overlaps at least one AD converter not connected to the one impedance converter circuit among the plurality of AD converters.

20. The image sensor according to claim 16, wherein the AD converter is connected to one or more vertical signal lines, among the M vertical signal lines, that overlap the AD converter in a plan view, and connected to one or more vertical signal lines, among the M vertical signal lines, that do not overlap the AD converter in the plan view.

* * * * *